US012750810B2

(12) United States Patent
Yerramalli et al.

(10) Patent No.: US 12,750,810 B2
(45) Date of Patent: Sep. 29, 2026

(54) LOW LATENCY MGP REQUEST HANDLING FOR POSITIONING

(71) Applicant: QUALCOMM Incorporated, San Diego, CA (US)

(72) Inventors: Srinivas Yerramalli, San Diego, CA (US); Alexandros Manolakos, Athens (GR); Sven Fischer, Nuremberg (DE); Guttorm Ringstad Opshaug, Redwood City, CA (US); Sony Akkarakaran, Poway, CA (US); Carlos Cabrera Mercader, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/686,387

(22) PCT Filed: Aug. 26, 2022

(86) PCT No.: PCT/US2022/041741
§ 371 (c)(1),
(2) Date: Feb. 23, 2024

(87) PCT Pub. No.: WO2023/075914
PCT Pub. Date: May 4, 2023

(65) Prior Publication Data
US 2025/0261153 A1 Aug. 14, 2025

(30) Foreign Application Priority Data
Oct. 29, 2021 (GR) .............................. 20210100753

(51) Int. Cl.
*H04W 64/00* (2009.01)
*H04L 5/00* (2006.01)
*H04W 24/08* (2009.01)

(52) U.S. Cl.
CPC ........... *H04W 64/00* (2013.01); *H04L 5/0055* (2013.01); *H04W 24/08* (2013.01)

(58) Field of Classification Search
CPC ...... H04W 64/00; H04W 24/08; H04L 5/0055
See application file for complete search history.

(56) References Cited

U.S. PATENT DOCUMENTS

2018/0206063 A1* 7/2018 Frenger .................. H04L 67/52
2018/0262868 A1* 9/2018 Edge .................... G01S 5/0036
(Continued)

FOREIGN PATENT DOCUMENTS

WO 2019032658 A1 2/2019

OTHER PUBLICATIONS

Intel Corporation: "Solutions for NR Positioning Latency Reduction", 3GPP TSG RAN WG1 #106bis-e, R1-2109614, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Oct. 2, 2021, XP052058557, the whole document, 9 Pages.
(Continued)

*Primary Examiner* — Lewis G West
(74) *Attorney, Agent, or Firm* — Procopio, Cory, Hargreaves & Savitch LLP/QUALCOMM Incorporated

(57) ABSTRACT

Methods, apparatuses, and computer-readable storage medium for positioning are provided. An example method at a base station may include transmitting, to a user equipment (UE), a location request requesting location information from the UE. The example method at the base station may further include receiving, from the UE, an acknowledgment acknowledging the location request. The example method at the base station may further include transmitting, to the UE based on the received acknowledgment, a measurement gap (MG) request associated with a location management func-
(Continued)

tion (LMF) for the UE to measure its location based on the transmitted location request.

30 Claims, 15 Drawing Sheets

(56) References Cited

U.S. PATENT DOCUMENTS

| | | | | |
|---|---|---|---|---|
| 2019/0021017 | A1* | 1/2019 | Nagaraja | H04L 5/0048 |
| 2019/0230619 | A1* | 7/2019 | Cui | H04W 64/00 |
| 2021/0067990 | A1* | 3/2021 | Opshaug | G01S 1/20 |
| 2021/0076240 | A1* | 3/2021 | Koziol | H04W 24/08 |
| 2021/0084608 | A1* | 3/2021 | Cui | H04W 24/10 |
| 2021/0320769 | A1* | 10/2021 | Cha | H04W 48/12 |
| 2023/0025902 | A1* | 1/2023 | Xu | H04L 5/0048 |
| 2023/0127945 | A1* | 4/2023 | Ko | H04W 64/00 455/456.1 |
| 2023/0199522 | A1* | 6/2023 | Manolakos | H04W 24/02 455/456.1 |
| 2024/0298291 | A1* | 9/2024 | Sahin | H04W 4/02 |
| 2026/0046812 | A1* | 2/2026 | Manolakos | H04W 64/00 |

OTHER PUBLICATIONS

International Search Report and Written Opinion—PCT/US2022/041741—ISA/EPO—Dec. 21, 2022.

ZTE Corporation., et al., "Discussion on MG for Inactive Positioning", 3GPP TSG-RAN WG2 Meeting #114-e, R2-2106430, 3rd Generation Partnership Project, Mobile Competence Centre, 650, Route Des Lucioles, F-06921 Sophia-Antipolis Cedex, France, vol. RAN WG2, No. Electronic meeting, May 19, 2021-May 27, 2021, May 11, 2021, XP052007776, the whole document, 4 Pages.

* cited by examiner

LOW LATENCY MGP REQUEST HANDLING FOR POSITIONING

CROSS REFERENCE TO RELATED APPLICATIONS

This application is a National Stage Application filed under 35 U.S.C. § 371 of PCT International Application Serial No. PCT/US2022/041741 entitled "LOW LATENCY MGP REQUEST HANDLING FOR POSITIONING" and filed on Aug. 26, 2022, which claims the benefit and priority to Greek application No. 20210100753, entitled "LOW LATENCY MGP REQUEST HANDLING FOR POSITIONING" and filed on Oct. 29, 2021, which are expressly incorporated by reference herein in their entirety.

TECHNICAL FIELD

The present disclosure relates generally to communication systems, and more particularly, to wireless communication systems utilizing a location management function (LMF) and a measurement gap (MG).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a base station are provided. The apparatus may include a memory and at least one processor coupled to the memory. The memory and the at least one processor coupled to the memory may be configured to transmit, to a user equipment (UE), a location request requesting location information from the UE. The memory and the at least one processor coupled to the memory may be further configured to receive, from the UE, an acknowledgment acknowledging the location request. The memory and the at least one processor coupled to the memory may be further configured to transmit, to the UE based on the received acknowledgment, an MG request initiated by an LMF for the UE to measure its location based on the transmitted location request.

In another aspect of the disclosure, a method, a computer-readable medium, and an apparatus at a UE are provided. The apparatus may include a memory and at least one processor coupled to the memory. The memory and the at least one processor coupled to the memory may be configured to transmit, to a base station, UE capability information indicating whether the UE supports transmitting an MG request through one of more of radio resource control (RRC) signaling, uplink control information (UCI), or an uplink (UL) medium access control (MAC) control element (CE) (MAC-CE). The memory and the at least one processor coupled to the memory may be further configured to receive, from the base station in response to the UE capability information, an MG request indication indicating one or more of the RRC signaling, the UCI, or the UL MAC-CE. The memory and the at least one processor coupled to the memory may be further configured to transmit, to the base station based on the MG request indication, the MG request.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, to a UE, a location request requesting location information from the UE. The memory and the at least one processor coupled to the memory may be further configured to transmit, to the UE after transmitting the location request, an MG request initiated by an LMF for the UE to measure its location based on the transmitted location request. The memory and the at least one processor coupled to the memory may be further configured to receive, from the UE, a rejection rejecting the location request. The memory and the at least one processor coupled to the memory may be further configured to receive, from the LMF based on the received rejection, an MG cancelation request to cancel the MG request for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
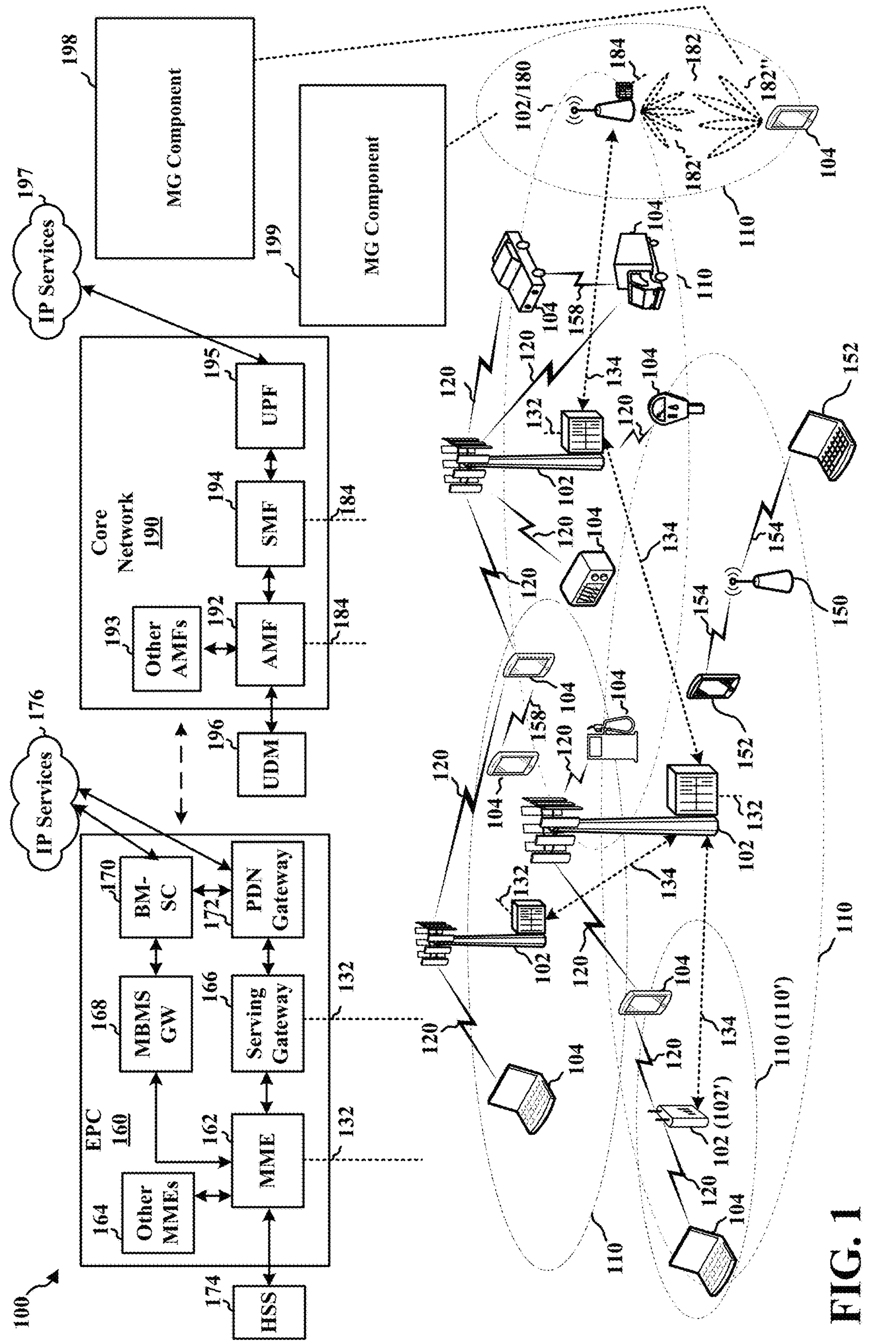
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an MG component 198. In some aspects, the MG component 198 may be configured to transmit, to a base station, UE capability information indicating whether the UE supports transmitting an MG request through one of more of RRC signaling, UCI, or an UL MAC-CE. In some aspects, the MG component 198 may be further configured to receive, from the base station in response to the UE capability information, an MG request indication indicating one or more of the RRC signaling, the UCI, or the UL MAC-CE. In some aspects, the MG component 198 may be further configured to transmit, to the base station based on the MG request indication, the MG request.

In certain aspects, the base station 180 may include an MG component 199. In some aspects, the MG component 199 may be configured to transmit, to a UE, a location request requesting location information from the UE. In some aspects, the MG component 199 may be further configured to receive, from the UE, an acknowledgment acknowledging the location request. In some aspects, the MG component 199 may be further configured to transmit, to the UE based on the received acknowledgment, an MG request initiated by an LMF for the UE to measure its location based on the transmitted location request. In some aspects, the MG component 199 may be further configured to transmit, to a UE, a location request requesting location information from the UE. In some aspects, the MG component 199 may be further configured to transmit, to the UE after transmitting the location request, an MG request initiated by an LMF for the UE to measure its location based on the transmitted location request. In some aspects, the MG component 199 may be further configured to receive, from the UE, a rejection rejecting the location request. In some aspects, the MG component 199 may be further configured to receive, from the LMF based on the received rejection, an MG cancelation request to cancel the MG request for the UE.

Although the following description may be focused on 5G NR, the concepts described herein may be applicable to other similar areas, such as LTE, LTE-A, CDMA, GSM, and other wireless technologies.

Figure 2A:
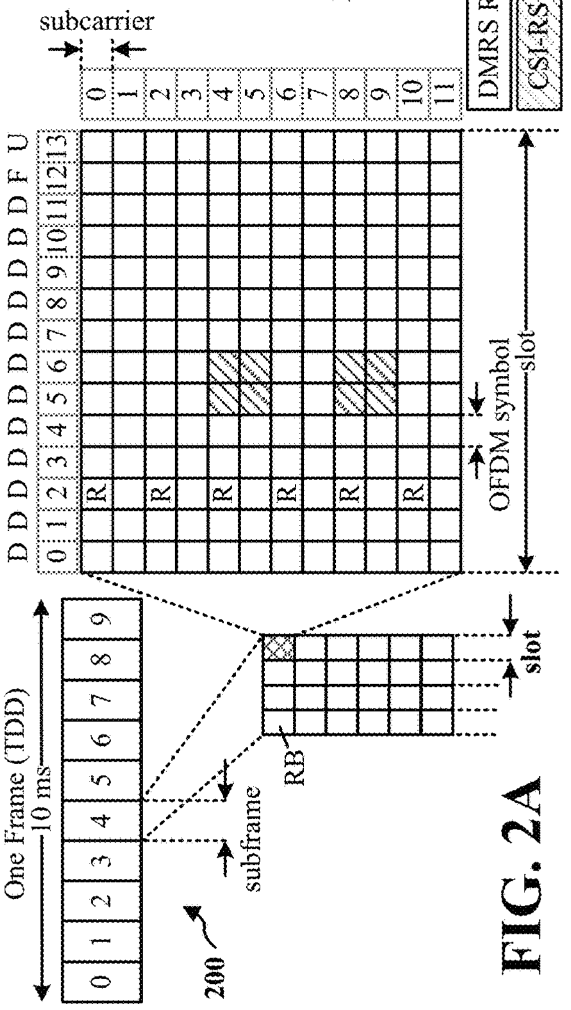
FIG. 2A is a diagram illustrating an example of a first frame, in accordance with various aspects of the present disclosure.
Figure 2B:
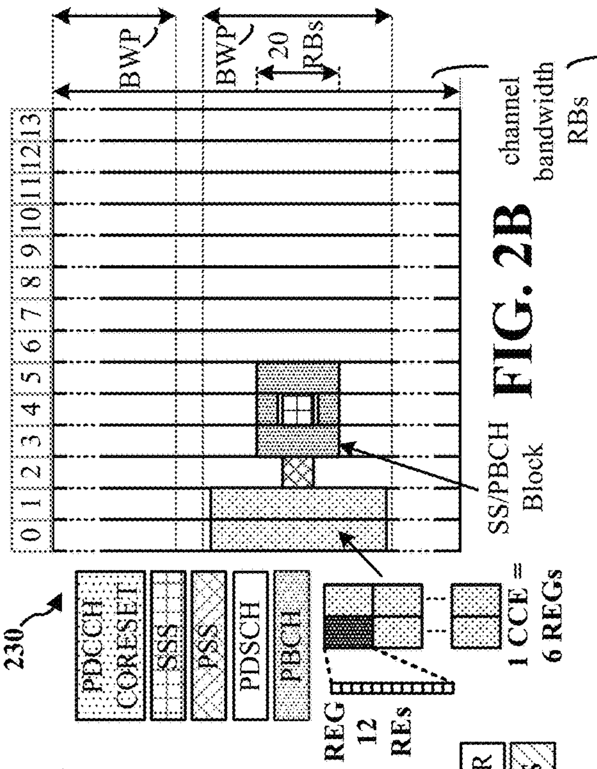
FIG. 2B is a diagram illustrating an example of DL channels within a subframe, in accordance with various aspects of the present disclosure.
Figure 2C:
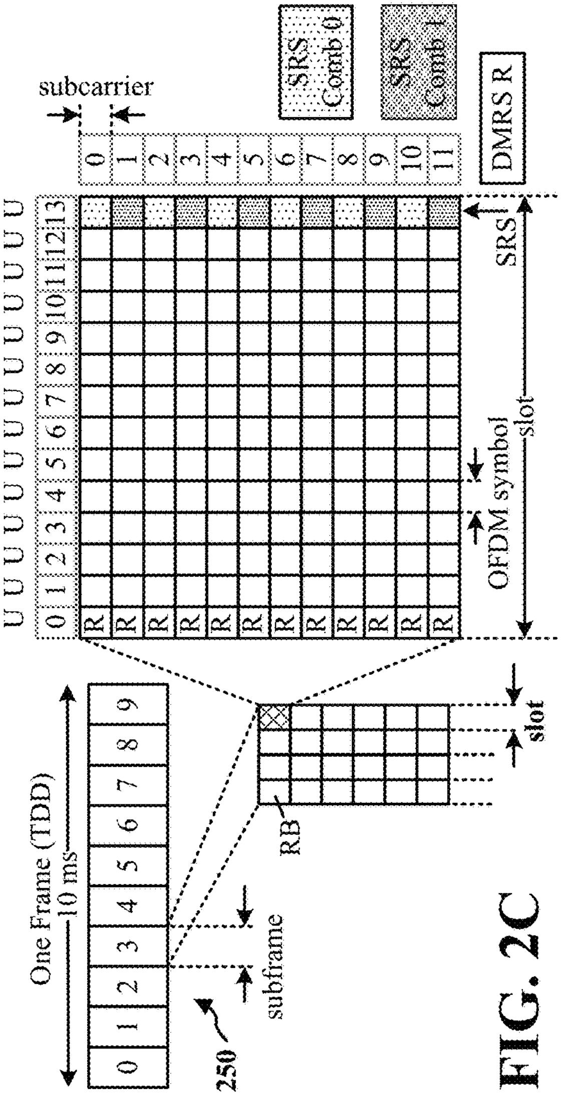
FIG. 2C is a diagram illustrating an example of a second frame, in accordance with various aspects of the present disclosure.
Figure 2D:
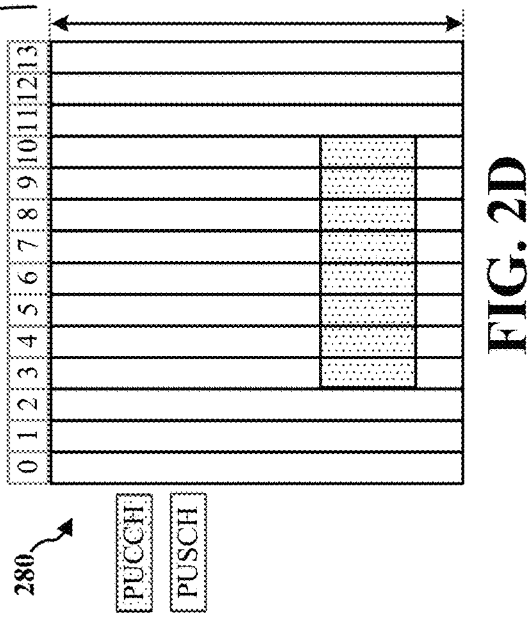
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
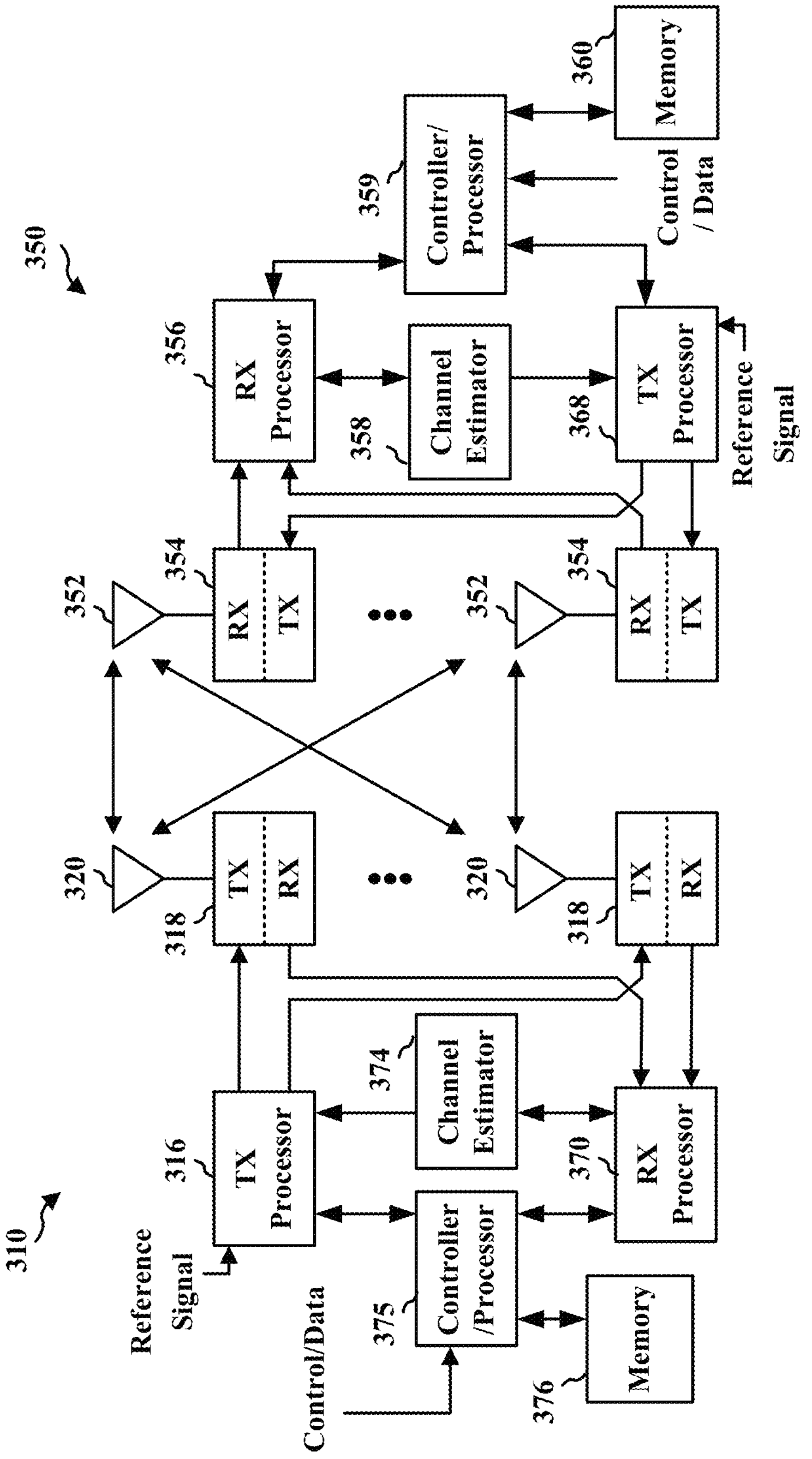
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with MG component 198 of FIG. 1.

At least one of the TX processor 316, the RX processor 370, and the controller/processor 375 may be configured to perform aspects in connection with MG component 199 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDOA) measurements, and report them to a positioning entity (e.g., a location management function (LMF)). For example, the UE may receive identifiers (IDs) of a reference base station (e.g., a serving base station) and multiple non-reference base stations in assistance data. The UE may then measure the RSTD between the reference base station and each of the non-reference base stations. Based on the known locations of the involved base stations and the RSTD measurements, the positioning entity can estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID and the timing advance (TA), as well as the identifiers, estimated timing, and signal strength of detected neighbor base stations. The location of the UE is then estimated based on this information and the known locations of the base station(s).

To assist positioning operations, a location server (e.g., a location server, an LMF, or an SLP) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations (e.g., in periodically broadcasted overhead messages, etc.). In some cases, the UE may be able to detect neighbor network nodes without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may also be referred to as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include PRS, tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots. The periodicity may be a time from a first repetition of a first PRS resource of a first PRS instance to the same first repetition of the same first PRS resource of the next PRS instance. For example, the periodicity may have a length selected from $2^{\mu}*\{4, 5, 8, 10, 16, 20, 32, 40, 64, 80, 160, 320, 640, 1280, 2560, 5120, 10240\}$ slots, where $\mu=0, 1, 2, 3$. The repetition factor may have a length selected from {1, 2, 4, 6, 8, 16, 32} slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," and/or a "repetition," etc.

A positioning frequency layer (PFL) (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 4:
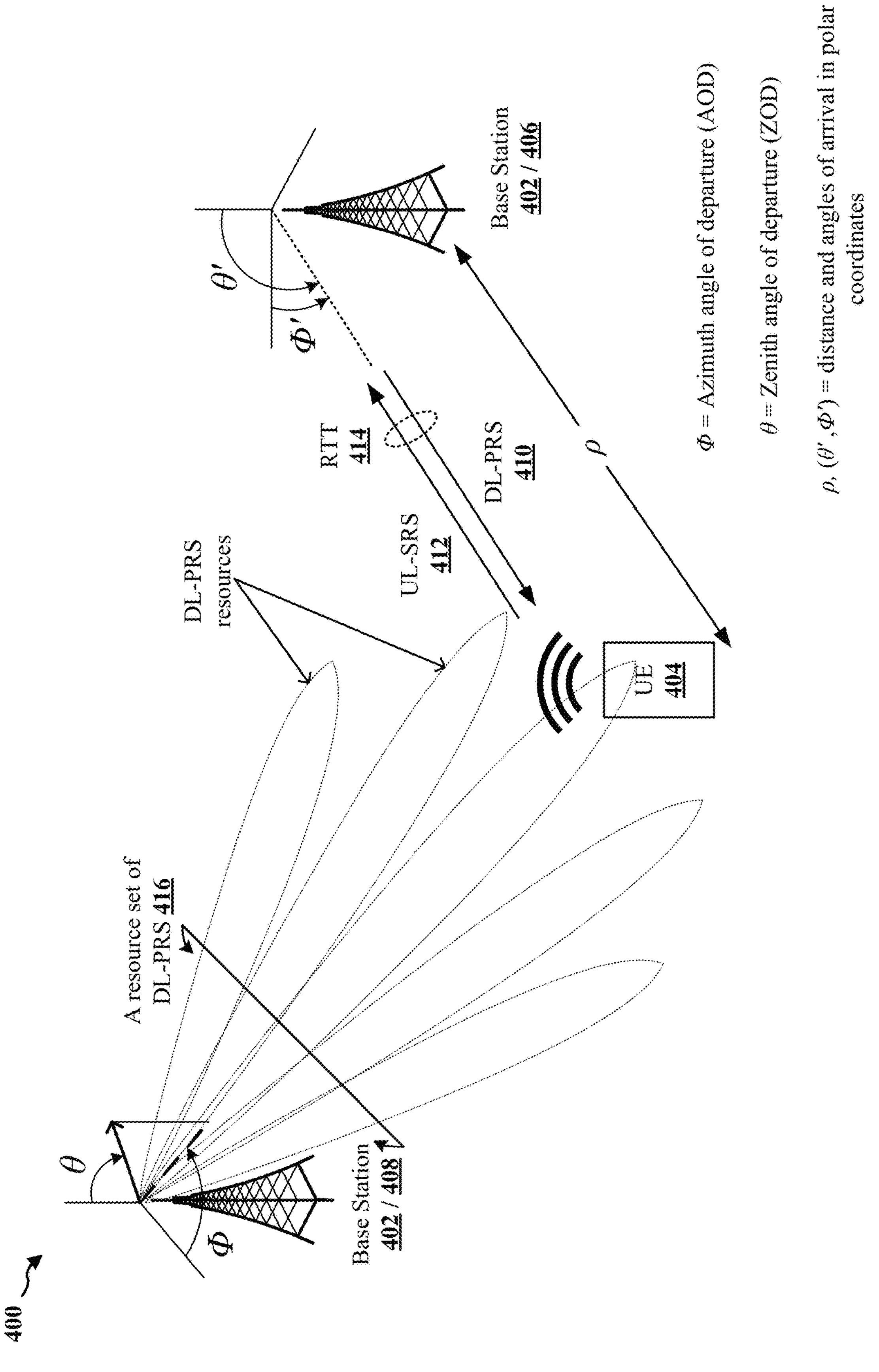
FIG. 4 is a diagram illustrating an example of a UE positioning based on reference signal measurements.

FIG. 4 is a diagram 400 illustrating an example of a UE positioning based on reference signal measurements in accordance with various aspects of the present disclosure. In one example, a location of UE 404 may be estimated based on multi-cell round trip time (multi-RTT) measurements, where multiple base stations 402 may perform round trip time (RTT) measurements for signals transmitted to and received from the UE 404 to determine the approximate distance of UE 404 with respect to each of the multiple base stations 402. Similarly, the UE 404 may perform RTT measurements for signals transmitted to and received from the base stations 402 to determine the approximate distance of each base station with respect to the UE 404. Then, based at least in part on the approximate distances of UE 404 with respect to the multiple base stations 402, a location management function (LMF) that is associated with the base stations 402 and/or the UE 404 may estimate the position of UE 404. For example, a base station 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, the base station 406 or an LMF associated with the base station 406 may identify the position of UE 404 (e.g., distance) with respect to the base station 406. Similarly, the UE 404 may transmit UL-SRS 412 to the base station 406, and may receive DL-PRS 410 transmitted from the base station 406. Based at least in part on measuring the RTT 414 between the UL-SRS 412 transmitted and the DL-PRS 410 received, the UE 404 or an LMF associated with the UE 404 may identify the position of base station 406 with respect to the UE 404. The multi-RTT measurement mechanism may be initiated by the LMF that is associated with the base station 406/408 and/or the UE 404. A base station may configure UL-SRS resources to a UE via radio resource control (RRC) signaling. In some examples, the UE and the base station (or TRPs of the base station) may report the multi-RTT measurements to the LMF, and the LMF may estimate the position of the UE based on the reported multi-RTT measurements.

In other examples, a position of a UE may be estimated based on multiple antenna beam measurements, where a downlink angle of departure (DL-AoD) and/or uplink angle of arrival (UL-AoA) of transmissions between a UE and one or more base stations/TRPs may be used to estimate the position of the UE and/or the distance of the UE with respect to each base station/TRP. For example, with regard to the DL-AoD, the UE 404 may perform reference signal received power (RSRP) measurements for a set of DL-PRS 416 transmitted from multiple transmitting beams (e.g., DL-PRS beams) of a base station 408, and the UE 404 may provide the DL-PRS beam measurements to a serving base station (or to the LMF associated with the base station). Based on the DL-PRS beam measurements, the serving base station or the LMF may derive the azimuth angle (e.g., $\Phi$) of departure and the zenith angle (e.g., $\theta$) of departure for DL-PRS beams of the base station 408. Then, the serving base station or the LMF may estimate the position of UE 404 with respect to the base station 408 based on the azimuth angle of departure and the zenith angle of departure of the DL-PRS beams. Similarly, for the UL-AoA, a position of a UE may be estimated based on UL-SRS beam measurements measured at different base stations, such as at the base stations 402. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the position of the UE and/or the UE distance with respect to each of the base stations based on the azimuth angle of arrival and the zenith angle of arrival of the UL-SRS beams.

MGs may be occasions configured for a UE to perform measurements on various signals. In some examples, a UE may not perform certain measurements, such as inter-frequency measurements, inter-radio access technology, or intra-frequency measurements outside of a UE's currently active bandwidth part (BWP), while performing transmission and reception. Inter-frequency measurements may include measuring a target cell if the target cell is at a different frequency compared to a current cell. Intra-frequency measurements outside of a UE's currently active BWP may include measuring a target cell if the target cell is at a different BWP of a same center frequency compared to a current cell. In some instances, the BWP between the target cell and the current cell may be different.

During an MG, a UE may focus on performing measurements without performing transmission and reception. A UE may perform measurements on SSBs of the neighbor cells during the MG. Specific parameters defining the MG, such as a starting position of the MG, a length of the MG, a number of MGs, an MG repetition period (MGRP) and other relevant parameters defining an MG, may be defined in an MG pattern. MGs may be provided on a per UE or a per FR basis. For example, for per FR MGs, different MG patterns may be provided for different FRs and a UE may accordingly use different MG patterns based on the FR. Different MG patterns may be associated with different MG pattern identifiers (IDs). The IDs and the associated MG patterns may be configured for the UE and the base station without signaling so that a base station may configure a UE with an MG pattern based on the identifier with minimal signaling overhead.

Figure 5:
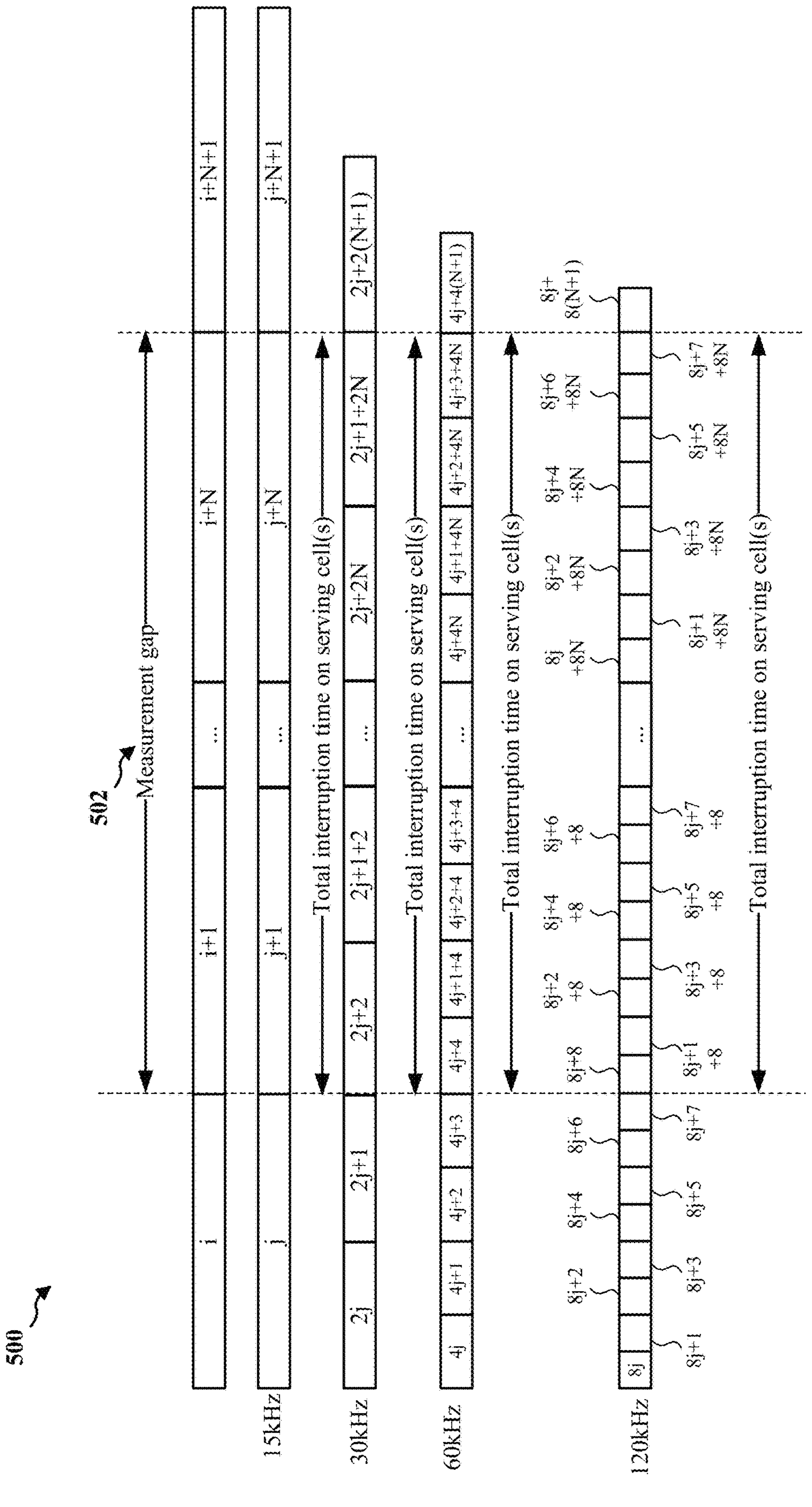
FIG. 5 is a diagram illustrating example MG.

FIG. 5 is a diagram 500 illustrating an example MG pattern. As illustrated in FIG. 5, the MG 502 may last for a defined period of time which may be different numbers of slots depending on the specific SCS. During the MG 502, there may be interruption on one or more serving cells of the UE and the duration of the MG 502 may be the same as the total interruption time. The starting and ending position of the MG 502 may be aligned with a slot/frame boundary. An MGRP may be additionally defined for the MG 502.

Figure 6:
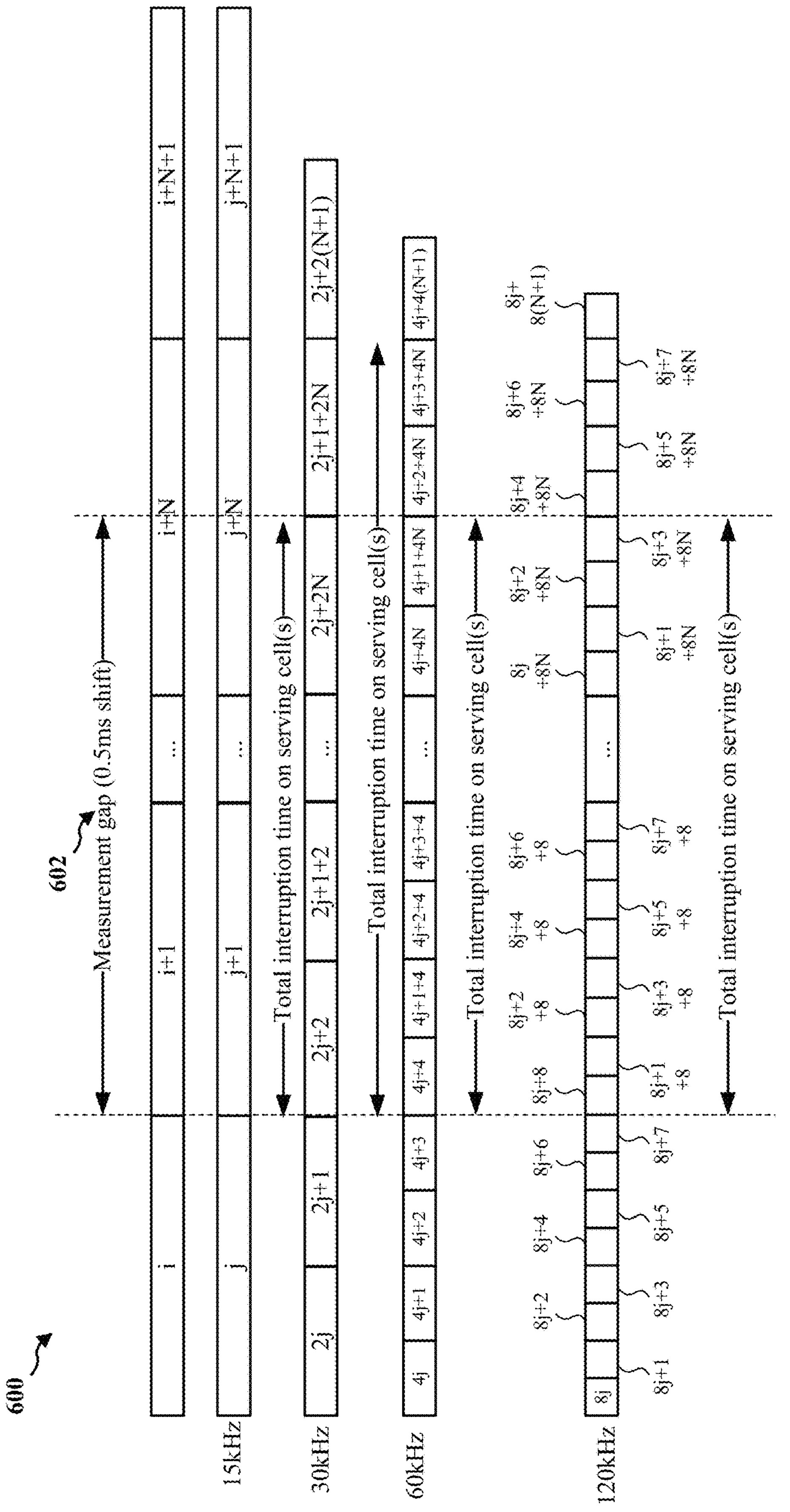
FIG. 6 is a diagram illustrating example MG.

FIG. 6 is a diagram 600 illustrating another example MG pattern. As illustrated in FIG. 6, the MG 602 may last for a defined period of time which may be different numbers of slots depending on the specific SCS. During the MG 602, there may be an interruption on one or more serving cells of the UE and the duration of the MG 602 may be the same as the total interruption time. The starting and ending position of the MG 602 may be aligned with a slot/frame boundary or not aligned with a slot/frame boundary. An MGRP may be additionally defined for the MG 602.

A PRS resource instance may or may not overlap with an MG occasion. To reduce positioning latency, MG requests that request an MG for positioning may be initiated by a UE or an LMF. A UE may initiate an MG request, by way of example, via uplink control information (UCI) or an uplink (UL) medium access control (MAC) control element (CE) (MAC-CE). An LMF may initiate an MG request, by way of example, via an NR positioning protocol A (NRPPa) message. A base station may activate the MG requested by the MG request, for example, by transmitting a downlink control information (DCI) or a DL MAC-CE. A UE may also autonomously apply the requested MG after transmitting the MG request.

Example aspects provided herein may provide more efficient MG activation and deactivation procedures via signaling mechanisms that prevent configuring a UE with an MG pattern that might be associated with a deactivated location request, and resolve conflicts between LMF-initiated and UE-initiated location requests. For example, the network (such as an LMF of the network) may send a location request to the UE and send an MG pattern (MGP) request (which may also be referred to as an "MG request"), for the UE, to the serving base station of the UE. If the UE is not able to process the location request for a variety of reasons, such as battery level, current activities, or any errors, the UE may transmit an error in response to the location request. However, the base station may not be aware of the transmitted error and may continue to configure the UE with an MG pattern (which may also be referred to as an "MGP") (which may be transmitting an MG request to the UE). The UE may be configured with an unused MG pattern associated with an inactive location request rejected by the UE. Such unused MG patterns may result in an interruption of the UE's operation, resulting in inefficiency of communication. Example aspects provided herein may prevent configuration of such unused MG patterns.

Figure 7:
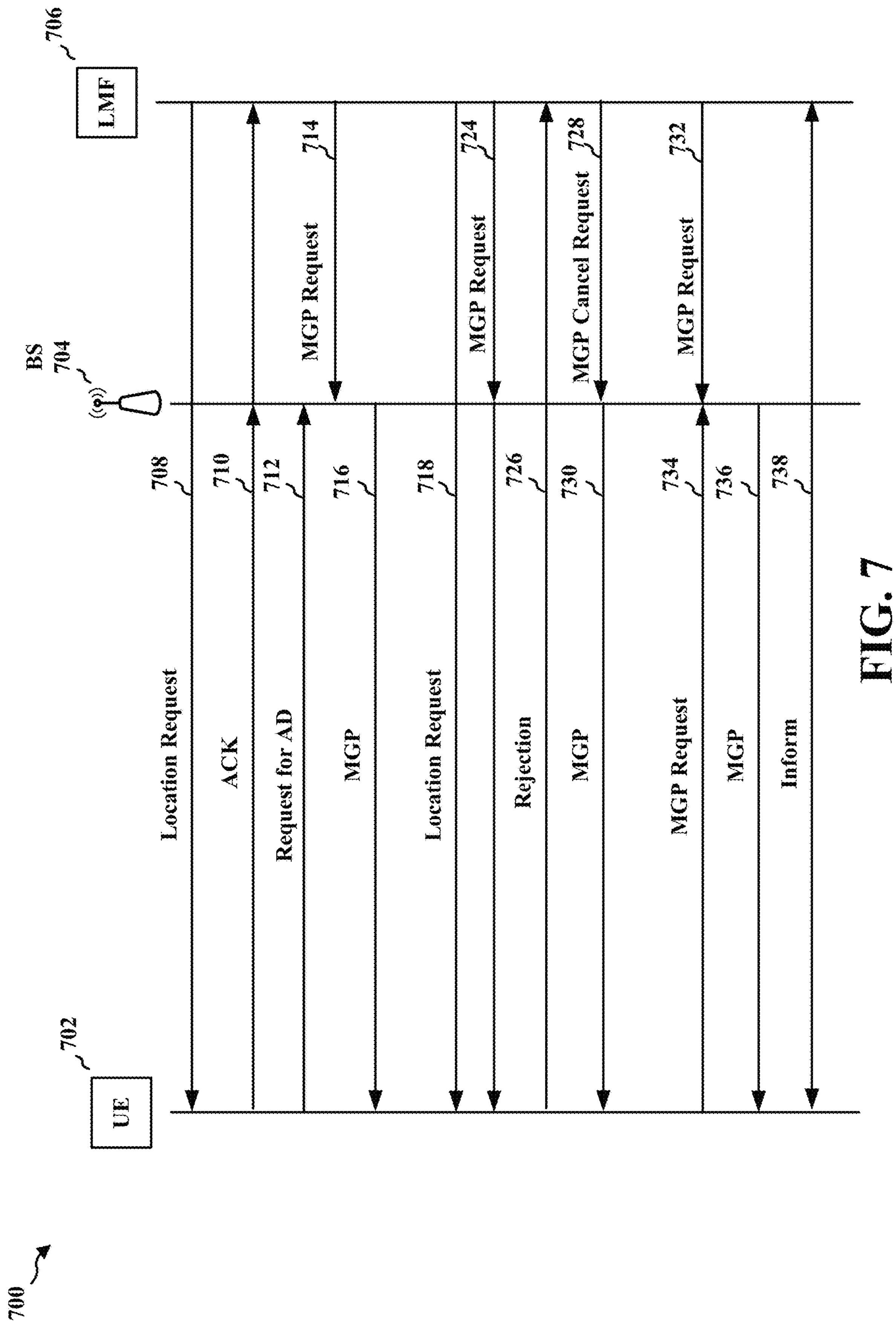
FIG. 7 is a diagram illustrating an example communication flow between a base station, a UE, and an LMF.

FIG. 7 is a diagram 700 illustrating an example communication flow between a base station 704, a UE 702, and an LMF 706. As illustrated in FIG. 7, a network may transmit, via the base station 704, a location request 708 to the UE 702. The location request may request location information of the UE 702. The network may wait for a positive acknowledgment (ACK) 710 from the UE 702. Upon receiving the location request 708, the UE 702 may transmit the ACK 710 (e.g., via the base station 704) if the UE is able to process the location request 708. The UE 702 may also transmit a request for assistance data (AD) 712 to the network (e.g., via the base station 704). The UE 702 may transmit an error message if the UE is unable to process the location request 708. After receiving the ACK 710 from the UE 702, the network, such as the LMF 706, may transmit an MGP request 714 for the UE 702 to the base station 704. The MGP request 714 may be transmitted via an NRPPa and may request the base station 704 to configure an MG pattern for the UE 702. The network may also forward the requested AD to the UE 702. The base station 704 may accordingly configure MG pattern (MGP) 716 for the UE 702. Therefore, the UE 702 may be configured with an MGP 716 for the location request if the UE processes the location request. The UE 702 may not be configured with an unused MG pattern associated with an inactive (rejected) location request. The UE 702 may also avoid an early configuration of the MG pattern that may be before the AD is sent to the UE 702.

In another example, the LMF 706 may transmit a location request 718 to the UE 702 and then transmit an MGP request 724 to the base station 704 without receiving an ACK from the UE 702. The MGP request 724 may be transmitted via an NRPPa and may request the base station 704 to configure an MG pattern for the UE 702 accordingly (e.g., by transmitting an MG request). If the UE 702 rejects the location request 718 by transmitting a rejection 726, the LMF 706 may transmit an MGP cancel request 728 to the base station 704 to cancel configuring an MGP 730 for the UE 702. In some aspects, the MGP 730 may be configured before the MGP cancel request 728 and the UE 702 may be configured with an unused MG pattern for a period of time until the base station 704 receives the MGP cancel request 728 and accordingly cancels the MGP 730. In some aspects, the MGP cancel request 728 may be received before the MGP 730 is configured, and the base station 704 may receive the MGP cancel request 728 and may accordingly cancel the MGP 730 so that the UE 702 may not be configured with an unused MG pattern.

If the MG pattern request is initiated by an LMF, the UE may need a different MG pattern and may not be aware of whether the LMF has transmitted an LMF request. Aspects provided herein may resolve a potential conflict between an LMF-initiated MGP request and a UE-initiated MGP request.

In some aspects, an initial MGP request may originate from the LMF 706 but cannot be originated from the UE 702. Subsequent MGP requests updating or deactivating the MGP may originate from either the LMF 706 or the UE 702 to the base station 704. The UE 702 may transmit the MGP request via RRC signaling, UCI, an UL MAC-CE, or the like. The LMF 706 may transmit the MGP request via an NRPPa. If there is a conflict between an MGP request 734 transmitted from the UE 702 to the base station 704 and an MGP request 732 transmitted from the LMF 706 to the base station 704, the base station 704 may resolve the conflict. In some aspects, the base station 704 may be configured to resolve the conflict by selecting the MGP request 734 transmitted from the UE 702 and configure the MGP 736 for the UE 702 based on the MGP request 734. In another example, the base station 704 may resolve the conflict. In some aspects, the base station 704 may be configured to resolve the conflict by selecting the MGP request 732 transmitted from the LMF 706 and configuring the MGP 736 for the UE 702 based on the MGP request 732. In some aspects, the base station 704 may be configured to resolve the conflict by selecting the MGP request 732 transmitted from the LMF 706 and configuring the MGP 736 for the UE 702 based on the MGP request 732 or selecting the MGP request 734 transmitted from the UE 702 and configuring the MGP 736 for the UE 702 based on the MGP request 734. The base station 704 may inform the LMF 706 with the selected MGP request.

In some aspects, instead of transmitting the MGP request 732, the LMF 706 may inform the UE 702 about the MGP request (at 738) and the UE 702 may accordingly inform the LMF 706 with one or more suitable MG patterns that are suitable for the UE 702 (at 738). In some aspects, the LMF 706 may update the MG pattern to a serving cell of the UE 702.

Figure 8:
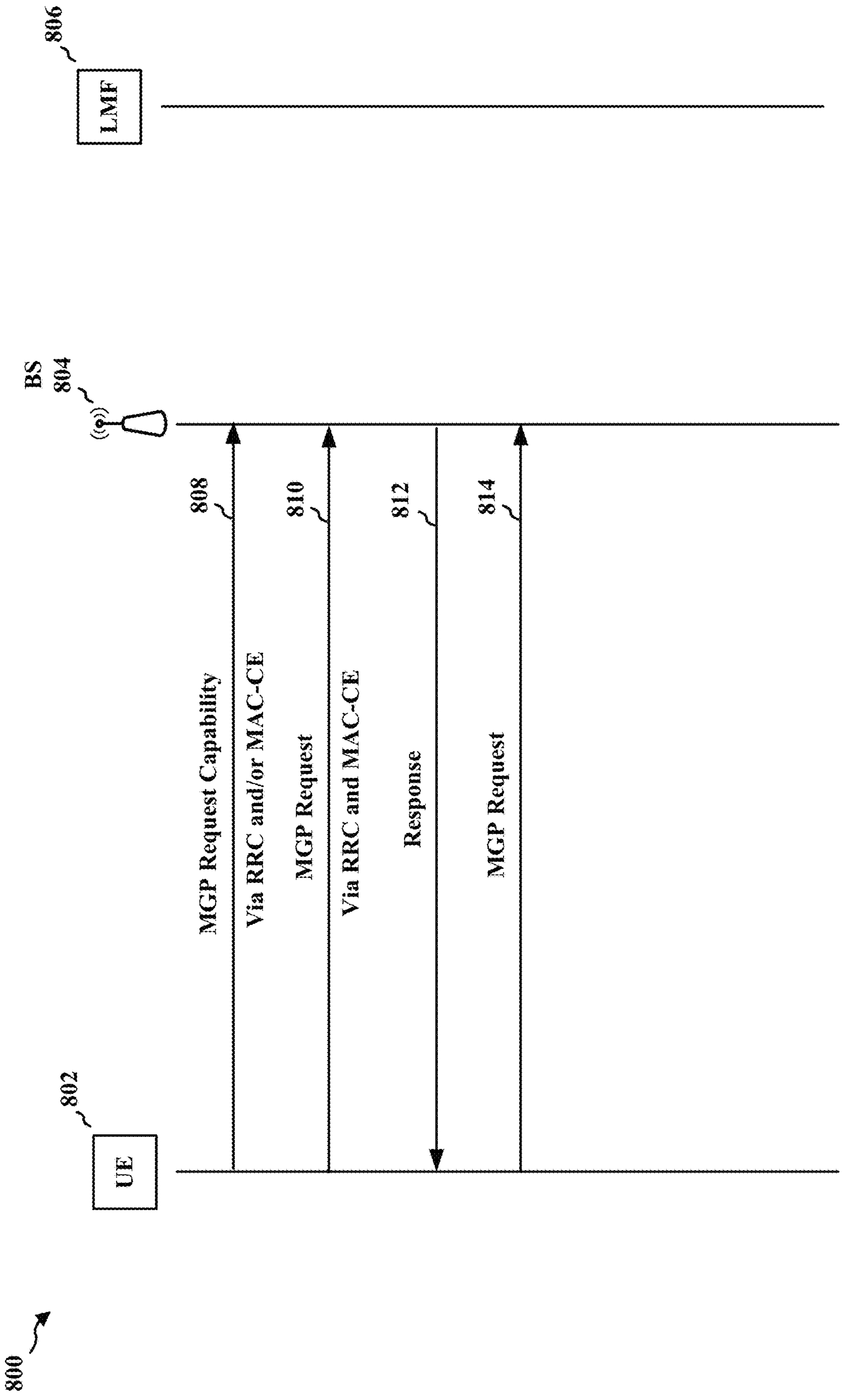
FIG. 8 is a diagram illustrating an example communication flow between a base station, a UE, and an LMF.

FIG. 8 is a diagram 800 illustrating an example communication flow between a base station 804, a UE 802, and an LMF 806. As illustrated in FIG. 8, the UE 802 may transmit an MGP request capability 808 indicating the UE's capability of transmitting an MGP request via UCI or a MAC-CE to the base station 804. The base station 804 may accordingly use an RRC-based MGP (e.g., an MGP transmitted via UCI) or a MAC-CE-based MGP (e.g., an MGP transmitted via MAC-CE) based on the MGP request capability 808. In some aspects, the UE 802 may probe the base station 804 with MGP requests 810 via RRC signaling and a MAC-CE. The base station 804 may implicitly respond. For example, if the base station 804 responds with response 812 via a MAC-CE, the UE 802 and the base station 804 may use a MAC-CE for the MGP going forward. If the base station 804 responds with response 812 via RRC signaling, the UE 802 and the base station 804 may use RRC signaling for the MGP going forward. In some aspects, the response 812 may indicate using one of RRC signaling or a MAC-CE. In some aspects, the UE 802 may accordingly transmit an MGP request 814 to the base station 804. In some aspects, UL MAC-CE or RRC requests associated with location measurements may include an indication that indicates the UL MAC-CE or RRC requests are associated with the location measurements.

Figure 9:
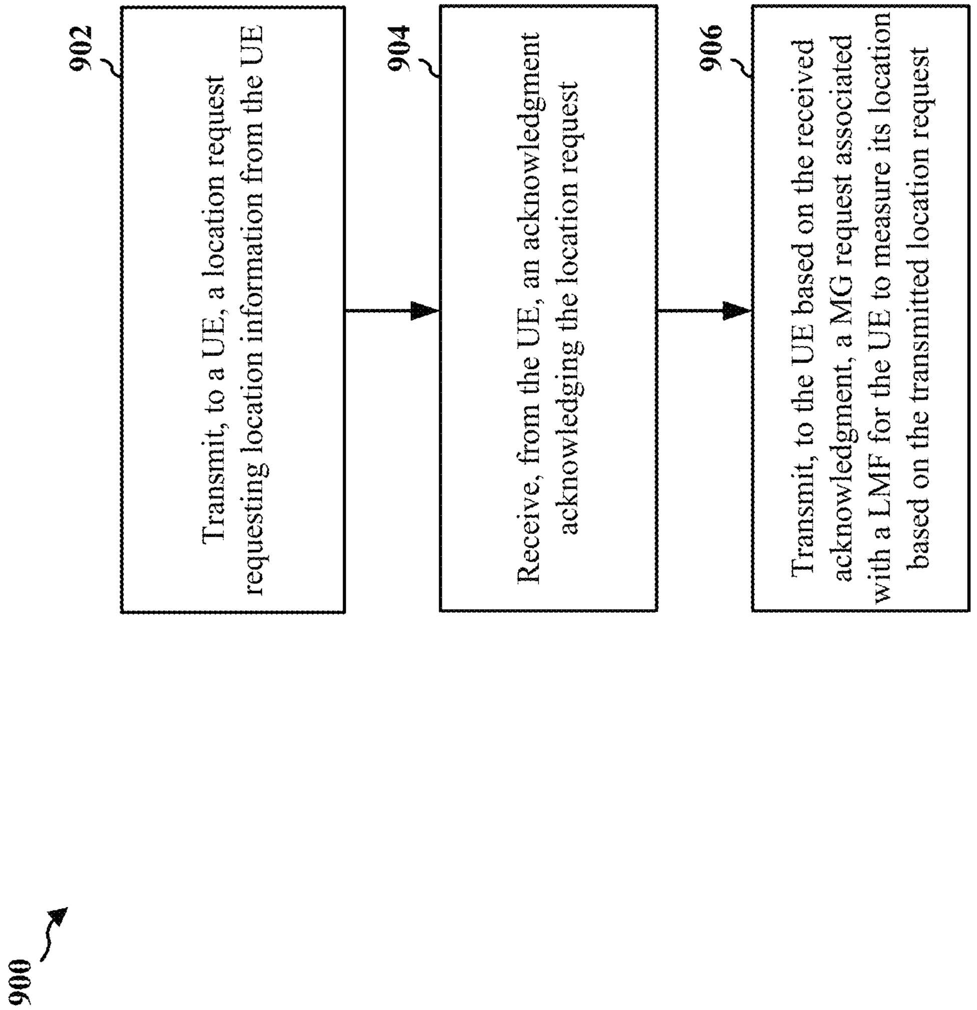
FIG. 9 is a flowchart of a method of wireless communication.

FIG. 9 is a flowchart 900 of a method of wireless communication. The method may be performed by a base station (e.g., the base station 102/180, the base station 704, the base station 804; the apparatus 1502).

At 902, the base station may transmit, to a UE, a location request requesting location information from the UE. For example, the base station 704 may transmit, to a UE 702, a location request 708 requesting location information from the UE 702. In some aspects, 902 may be performed by request component 1542 in FIG. 15.

At 904, the base station may receive, from the UE, an acknowledgment acknowledging the location request. For example, the base station 704 may receive, from the UE 702, an acknowledgment (e.g., ACK 710) acknowledging the location request 708. In some aspects, 904 may be performed by request component 1542 in FIG. 15.

At 906, the base station may transmit, to the UE based on the received acknowledgment, an MG request initiated by an LMF for the UE to measure its location based on the transmitted location request. For example, the base station 704 may transmit, to the UE 702 based on the received acknowledgment, an MG request (e.g., the MGP 716) initiated by an LMF 706 for the UE 702 to measure its location based on the transmitted location request. In some aspects, 906 may be performed by request component 1542 in FIG. 15.

Figure 10:
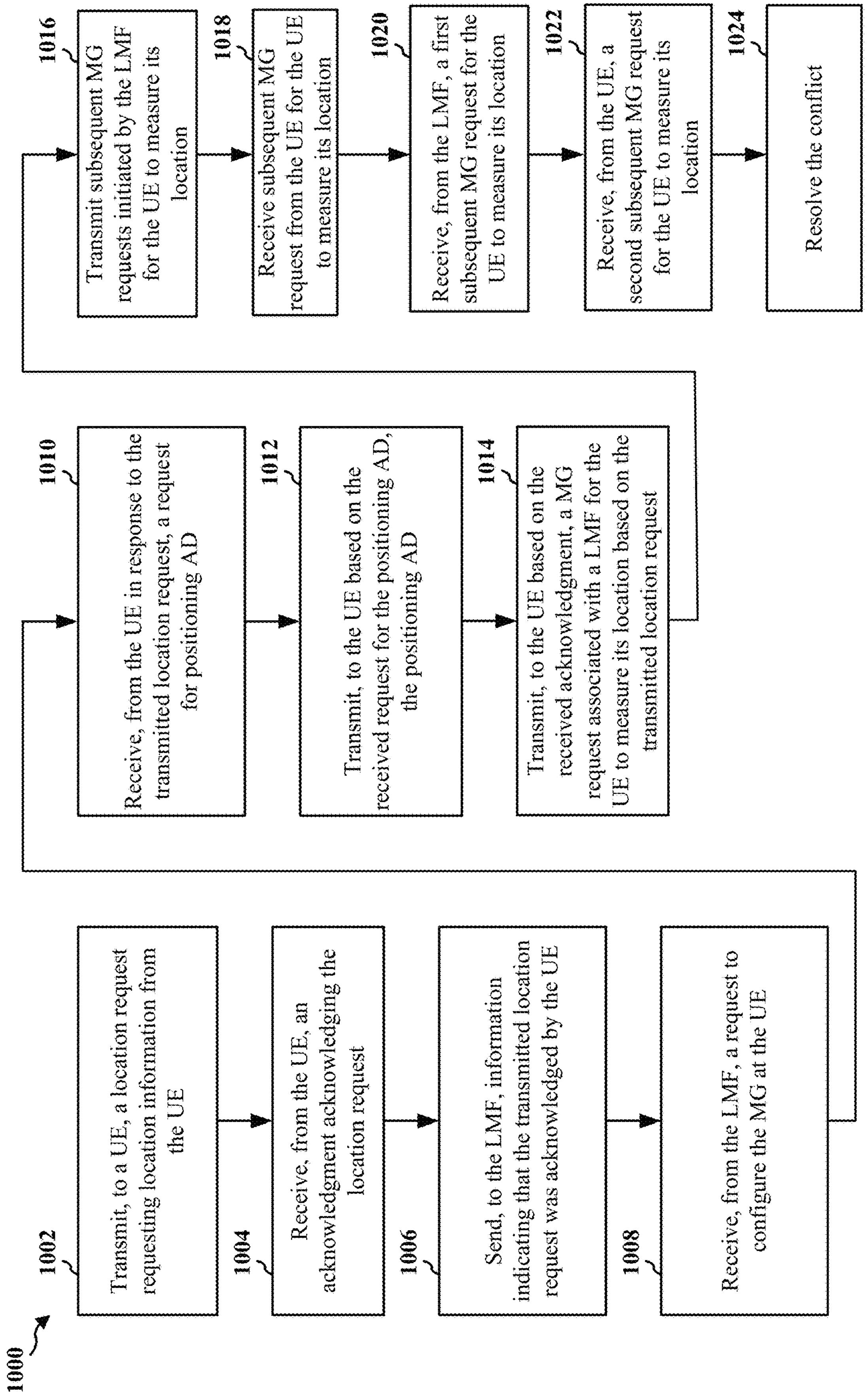
FIG. 10 is a flowchart of a method of wireless communication.

FIG. 10 is a flowchart 1000 of a method of wireless communication. The method may be performed by a base station (e.g., the base station 102/180, the base station 704, the base station 804; the apparatus 1502).

At 1002, the base station may transmit, to a UE, a location request requesting location information from the UE. For example, the base station 704 may transmit, to a UE 702, a location request 708 requesting location information from the UE 702. In some aspects, 1002 may be performed by request component 1542 in FIG. 15.

At 1004, the base station may receive, from the UE, an acknowledgment acknowledging the location request. For example, the base station 704 may receive, from the UE 702, an acknowledgment (e.g., ACK 710) acknowledging the location request 708. In some aspects, 1004 may be performed by request component 1542 in FIG. 15.

In some aspects, at 1006, the base station may send, to the LMF, information indicating that the transmitted location request was acknowledged by the UE. For example, the base station 704 may send, to the LMF 706, information indicating that the transmitted location request 708 was acknowledged by the UE 702. In some aspects, 1006 may be performed by request component 1542 in FIG. 15.

In some aspects, at 1008, the base station may receive from the LMF (e.g., based on the sent information), a request to configure the MG at the UE. For example, the base station 704 may receive from the LMF 706 (e.g., based on the sent information), a request to configure the MG at the UE (MGP request 714). In some aspects, 1008 may be performed by request component 1542 in FIG. 15. In some aspects, the MG request (e.g., configuring the MGP 716) is transmitted to the UE based on the received request from the LMF.

In some aspects, at 1010, the base station may receive, from the UE in response to the transmitted location request, a request for positioning AD. For example, the base station 704 may receive, from the UE 702 in response to the transmitted location request, a request for positioning AD (e.g., 712). In some aspects, 1010 may be performed by request component 1542 in FIG. 15.

In some aspects, at 1012, the base station may transmit, to the UE based on the received request for the positioning AD, the positioning AD. For example, the base station 704 may transmit, to the UE 702 based on the received request for the positioning AD, the positioning AD. In some aspects, 1012 may be performed by request component 1542 in FIG. 15.

At 1014, the base station may transmit, to the UE based on the received acknowledgment, an MG request initiated by an LMF for the UE to measure its location based on the transmitted location request. For example, the base station 704 may transmit, to the UE 702 based on the received acknowledgment, an MG request (e.g., the MGP 716) initiated by an LMF 706 for the UE 702 to measure its location based on the transmitted location request. In some aspects, 1014 may be performed by request component 1542 in FIG. 15. In some aspects, the base station may transmit the MG request after transmitting the positioning AD to the UE.

In some aspects, at 1016, the base station may transmit subsequent MG requests initiated by the LMF for the UE to measure its location. For example, the base station 704 may transmit subsequent MG requests initiated by the LMF 706 for the UE 702 to measure its location. In some aspects, 1014 may be performed by request component 1542 in FIG. 15.

In some aspects, at 1018, the base station may receive subsequent MG requests from the UE for the UE to measure its location. For example, the base station 704 may receive subsequent MG requests (e.g., MGP request 734) from the UE 702 for the UE 702 to measure its location. In some aspects, 1014 may be performed by request component 1542 in FIG. 15. In some aspects, the subsequent MG requests from the UE may be received in acknowledgments to transmitted location requests.

In some aspects, at 1020, the base station may receive from the LMF, a first subsequent MG request for the UE to measure its location. For example, the base station 704 may receive from the LMF 706, a first subsequent MG request 732 for the UE 702 to measure its location. In some aspects, 1020 may be performed by resolve component 1544 in FIG. 15.

In some aspects, at 1022, the base station may receive from the UE, a second subsequent MG request for the UE to measure its location. For example, the base station 704 may receive from the UE 702, a second subsequent MG request 734 for the UE 702 to measure its location. In some aspects, 1022 may be performed by resolve component 1544 in FIG. 15. In some aspects, the first subsequent MG request and the second subsequent MG request may be concurrent and conflicting. For example, there may be concurrent reception of the first subsequent MG request and the second subsequent MG request, and there may be a conflict between the first subsequent MG request and the second subsequent MG request.

In some aspects, at 1024, the base station may resolve the conflict between the first subsequent MG request and the second subsequent MG request by selecting to configure the UE with one of the first subsequent MG request or the second subsequent MG request. For example, the base station 704 may resolve the conflict between the first subsequent MG request and the second subsequent MG request by selecting to configure the UE 702 based on one of the MGP request 734 or the MGP request 732. In some aspects, 1024 may be performed by resolve component 1544 in FIG. 15. In some aspects, the base station may resolve the conflict between the first subsequent MG request and the second subsequent MG request by selecting to configure the UE with the first subsequent MG request. In some aspects, the base station may resolve the conflict between the first subsequent MG request and the second subsequent MG request by selecting to configure the UE with the second subsequent MG request. In some aspects, the base station may inform the LMF about a resolution of the conflict of the concurrent reception of the first subsequent MG request and the second subsequent MG request.

Figure 11:
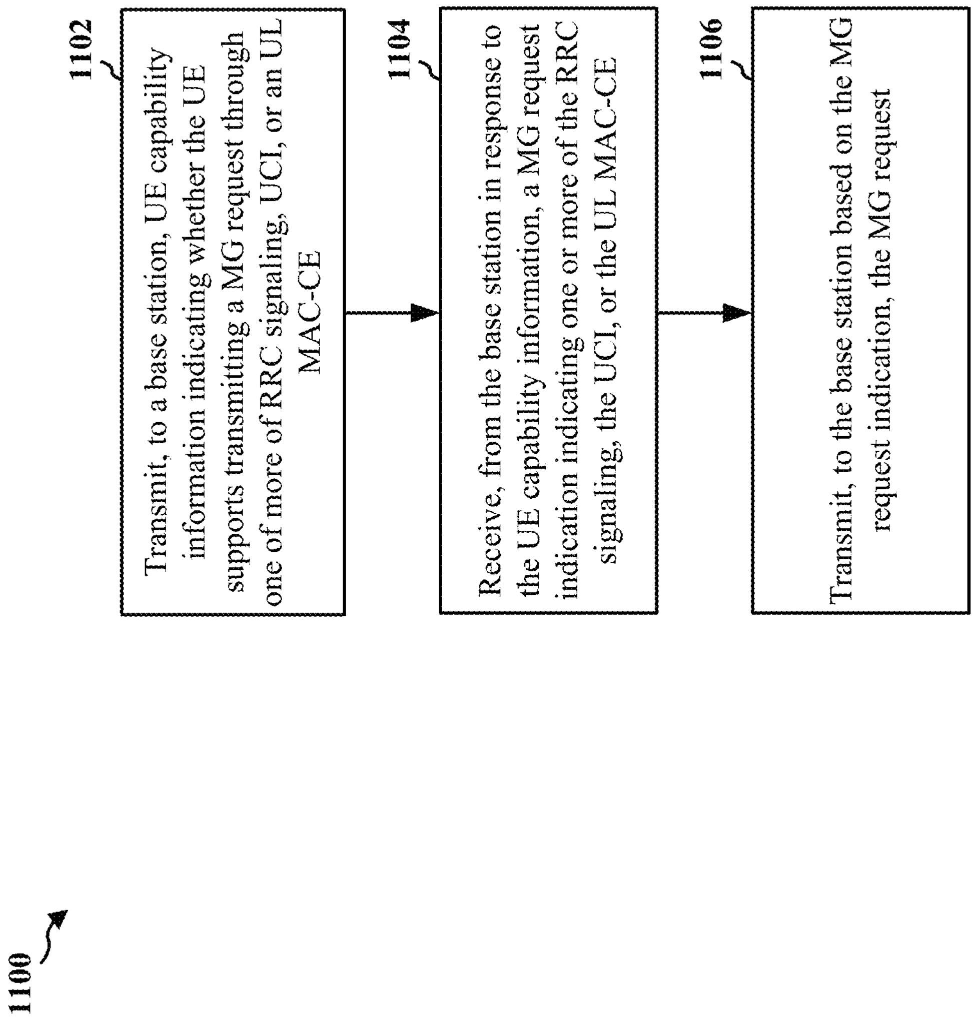
FIG. 11 is a flowchart of a method of wireless communication.

FIG. 11 is a flowchart 1100 of a method of wireless communication. The method may be performed by a UE (e.g., the UE 104, the UE 702, the UE 802; the apparatus 1402).

At 1102, the UE may transmit, to a base station, UE capability information indicating whether the UE supports transmitting an MG request through one of more of RRC signaling, UCI, or an UL MAC-CE. For example, the UE 802 may transmit, to a base station 804, MGP request capability 808 indicating whether the UE supports transmitting an MG request through one of more of RRC signaling, UCI, or an UL MAC-CE. In some aspects, 1102 may be performed by capability component 1442 in FIG. 14.

At 1104, the UE may receive, from the base station in response to the UE capability information, an MG request indication indicating one or more of the RRC signaling, the UCI, or the UL MAC-CE. For example, the UE 802 may receive, from the base station 804 in response to the UE capability information, an MG request indication (e.g., response 812) indicating one or more of the RRC signaling, the UCI, or the UL MAC-CE. In some aspects, 1104 may be performed by indication component 1444 in FIG. 14. In some aspects, the MG request indication may indicate the RRC signaling. In some aspects, the MG request indication may indicate the UL MAC-CE. In some aspects, the MG request indication may be implicit.

At 1106, the UE may transmit, to the base station based on the MG request indication, the MG request. For example, the UE 802 may transmit, to the base station 804 based on the MG request indication, the MG request 814. In some aspects, 1106 may be performed by request component 1446 in FIG. 14.

Figure 12:
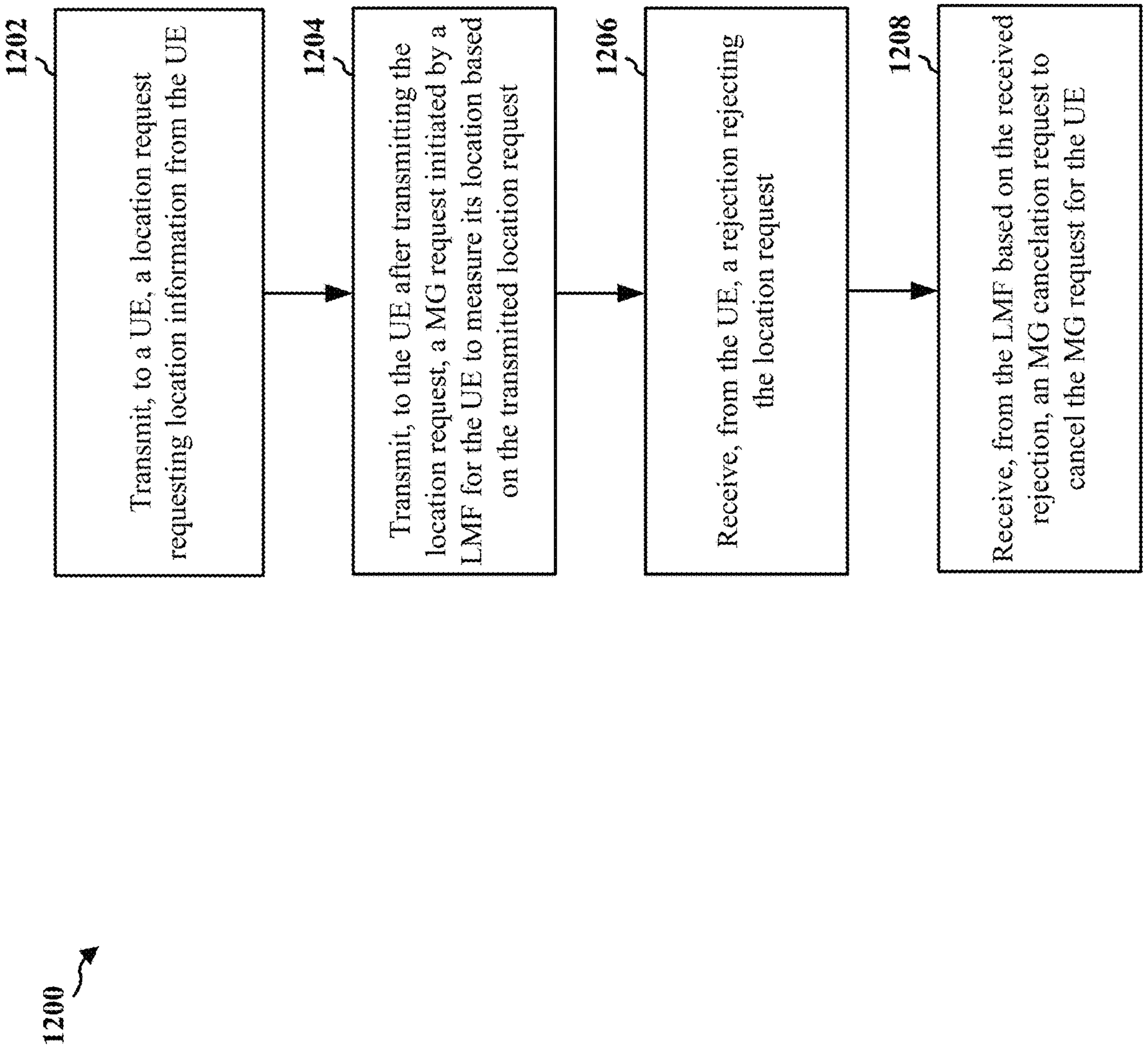
FIG. 12 is a flowchart of a method of wireless communication.

FIG. 12 is a flowchart 1200 of a method of wireless communication. The method may be performed by a base station (e.g., the base station 102/180, the base station 704, the base station 804; the apparatus 1502).

At 1202, the base station may transmit, to a UE, a location request requesting location information from the UE. For example, the base station 704 may transmit, to a UE 702, a location request 718 requesting location information from the UE. In some aspects, 1202 may be performed by request component 1542 in FIG. 15.

At 1204, the base station may transmit, to the UE after transmitting the location request, an MG request initiated by an LMF for the UE to measure its location based on the transmitted location request. For example, the base station 704 may transmit, to the UE 702 after transmitting the location request, an MG request 724 initiated by an LMF 706 for the UE 702 to measure its location based on the transmitted location request. In some aspects, 1204 may be performed by request component 1542 in FIG. 15.

At 1206, the base station may receive, from the UE, a rejection rejecting the location request. For example, the base station 704 may receive, from the UE 702, a rejection 726 rejecting the location request. In some aspects, 1206 may be performed by cancel component 1546 in FIG. 15.

At 1208, the base station may receive, from the LMF based on the received rejection, an MG cancelation request to cancel the MG request for the UE. For example, the base station 704 may receive, from the LMF 706 based on the received rejection, an MG cancelation request 728 to cancel the MG request for the UE. In some aspects, 1208 may be performed by cancel component 1546 in FIG. 15.

Figure 13:
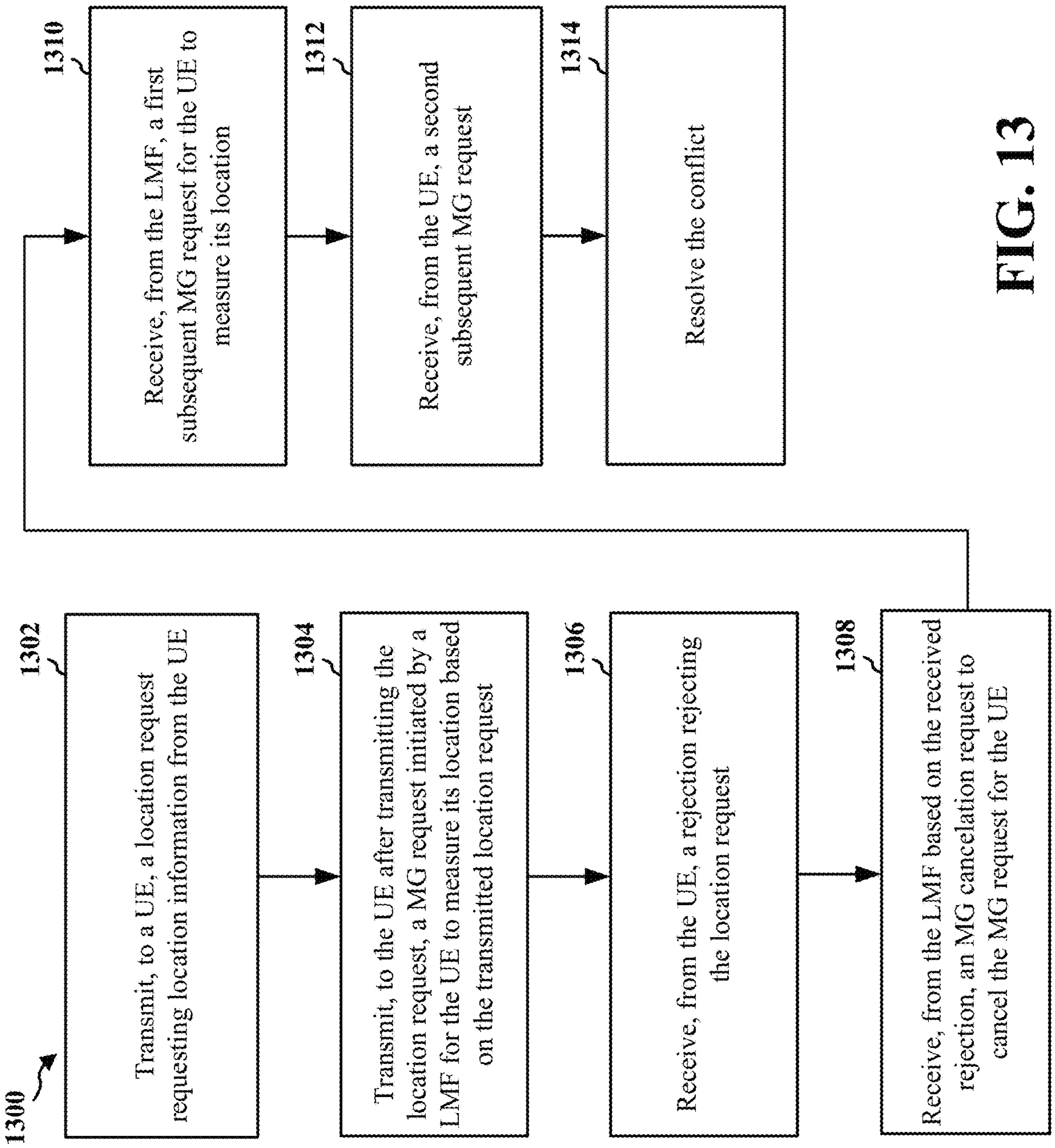
FIG. 13 is a flowchart of a method of wireless communication.

FIG. 13 is a flowchart 1300 of a method of wireless communication. The method may be performed by a base station (e.g., the base station 102/180, the base station 704, the base station 804; the apparatus 1502).

At 1302, the base station may transmit, to a UE, a location request requesting location information from the UE. For example, the base station 704 may transmit, to a UE 702, a location request 718 requesting location information from the UE. In some aspects, 1302 may be performed by request component 1542 in FIG. 15.

At 1304, the base station may transmit, to the UE after transmitting the location request, an MG request initiated by an LMF for the UE to measure its location based on the transmitted location request. For example, the base station 704 may transmit, to the UE 702 after transmitting the location request, an MG request 724 initiated by an LMF 706 for the UE 702 to measure its location based on the transmitted location request. In some aspects, 1304 may be performed by request component 1542 in FIG. 15.

At 1306, the base station may receive, from the UE, a rejection rejecting the location request. For example, the base station 704 may receive, from the UE 702, a rejection 726 rejecting the location request. In some aspects, 1306 may be performed by cancel component 1546 in FIG. 15.

At 1308, the base station may receive, from the LMF based on the received rejection, an MG cancelation request to cancel the MG request for the UE. For example, the base station 704 may receive, from the LMF 706 based on the received rejection, an MG cancelation request 728 to cancel the MG request for the UE. In some aspects, 1308 may be performed by cancel component 1546 in FIG. 15. In some aspects, the base station may send, to the LMF, information indicating that the transmitted location request was rejected by the UE. In some aspects, the MG cancelation request is received from the LMF based on the information sent to the LMF. In some aspects, the base station may transmit subsequent MG requests initiated by the LMF for the UE to measure its location. In some aspects, the base station may receive subsequent MG requests from the UE for the UE to measure its location. In some aspects, the subsequent MG requests from the UE may be received in acknowledgments to transmitted location requests.

In some aspects, at 1310, the base station may receive from the LMF, a first subsequent MG request for the UE to measure its location. For example, the base station 704 may receive from the LMF 706, a first subsequent MG request 732 for the UE 702 to measure its location. In some aspects, 1310 may be performed by resolve component 1544 in FIG. 15. In some aspects, In some aspects, at 1312, the base station may receive from the UE, a second subsequent MG request for the UE to measure its location. For example, the base station 704 may receive from the UE 702, a second subsequent MG request 734 for the UE 702 to measure its location. In some aspects, 1312 may be performed by resolve component 1544 in FIG. 15. In some aspects, the first subsequent MG request and the second subsequent MG request may be concurrent and conflicting. For example, there may be concurrent reception of the first subsequent MG request and the second subsequent MG request, and there may be a conflict between the first subsequent MG request and the second subsequent MG request.

In some aspects, at 1314, the base station may resolve the conflict between the first subsequent MG request and the second subsequent MG request by selecting to configure the UE with one of the first subsequent MG request or the second subsequent MG request. For example, the base station 704 may resolve the conflict between the first subsequent MG request and the second subsequent MG request by selecting to configure the UE 702 based on one of the MGP request 734 or the MGP request 732. In some aspects, 1314 may be performed by resolve component 1544 in FIG. 15. In some aspects, the base station may resolve the conflict between the first subsequent MG request and the second subsequent MG request by selecting to configure the UE with the first subsequent MG request. In some aspects, the base station may resolve the conflict between the first subsequent MG request and the second subsequent MG request by selecting to configure the UE with the second subsequent MG request. In some aspects, the base station may inform the LMF about a resolution of the conflict of the concurrent reception of the first subsequent MG request and the second subsequent MG request.

Figure 14:
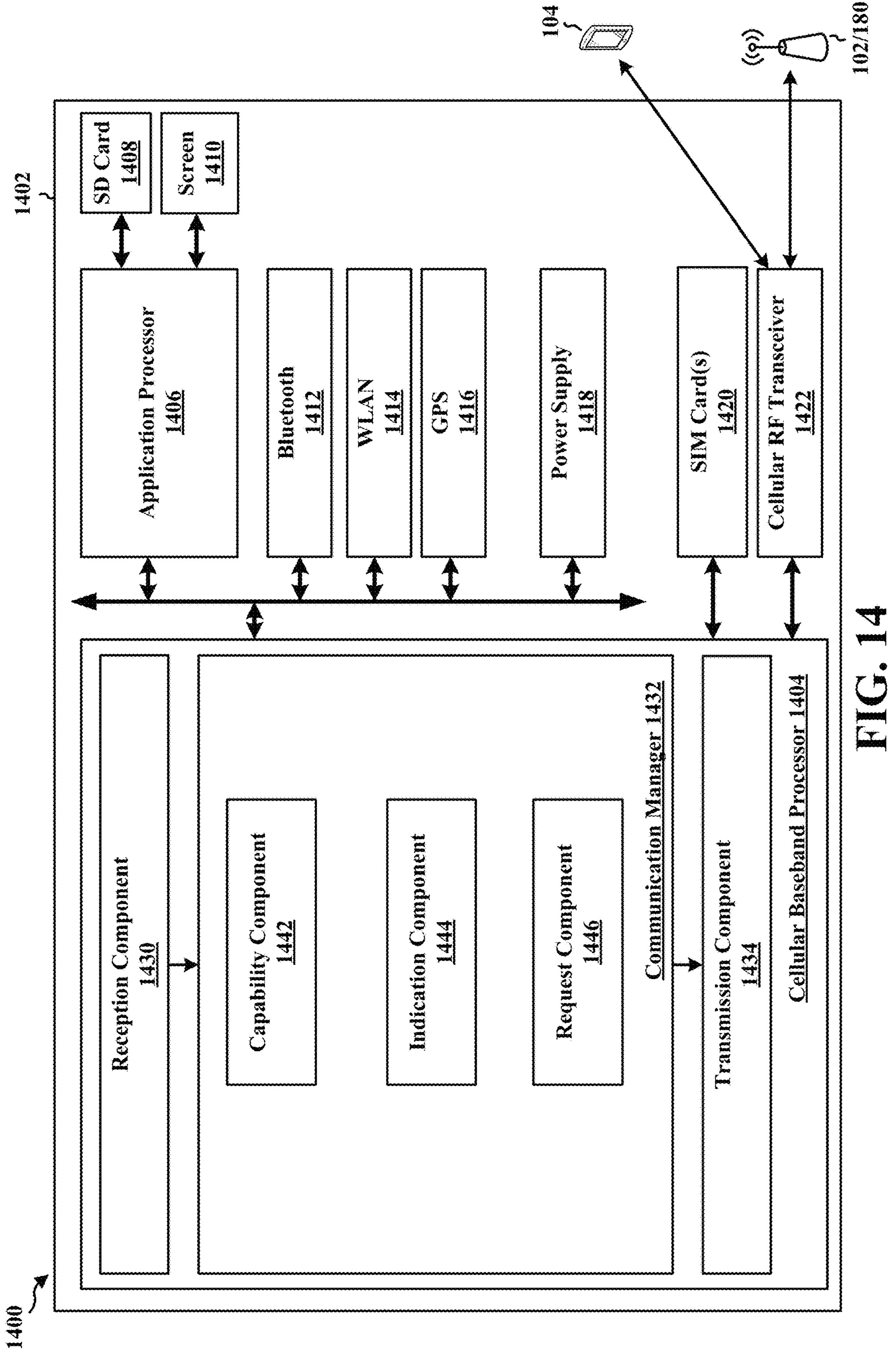
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include a capability component 1442 that is configured to transmit, to a base station, UE capability information indicating whether the UE supports transmitting an MG request through one of more of RRC signaling, UCI, or an UL MAC-CE, e.g., as described in connection with 1102 in FIG. 11. The communication manager 1432 may further include an indication component 1444 that may be configured to receive, from the base station in response to the UE capability information, an MG request indication indicating one or more of the RRC signaling, the UCI, or the UL MAC-CE, e.g., as described in connection with 1104 in FIG. 11. The communication manager 1432 may further include a request component 1446 that may be configured to transmit, to the base station based on the MG request indication, the MG request, e.g., as described in connection with 1106 in FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for transmitting, to a base station, UE capability information indicating whether the UE supports transmitting an MG request through one of more of RRC signaling, UCI, or an UL MAC-CE. The cellular baseband processor 1404 may further include means for receiving, from the base station in response to the UE capability information, an MG request indication indicating one or more of the RRC signaling, the UCI, or the UL MAC-CE. The cellular baseband processor 1404 may further include means for transmitting, to the base station based on the MG request indication, the MG request. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
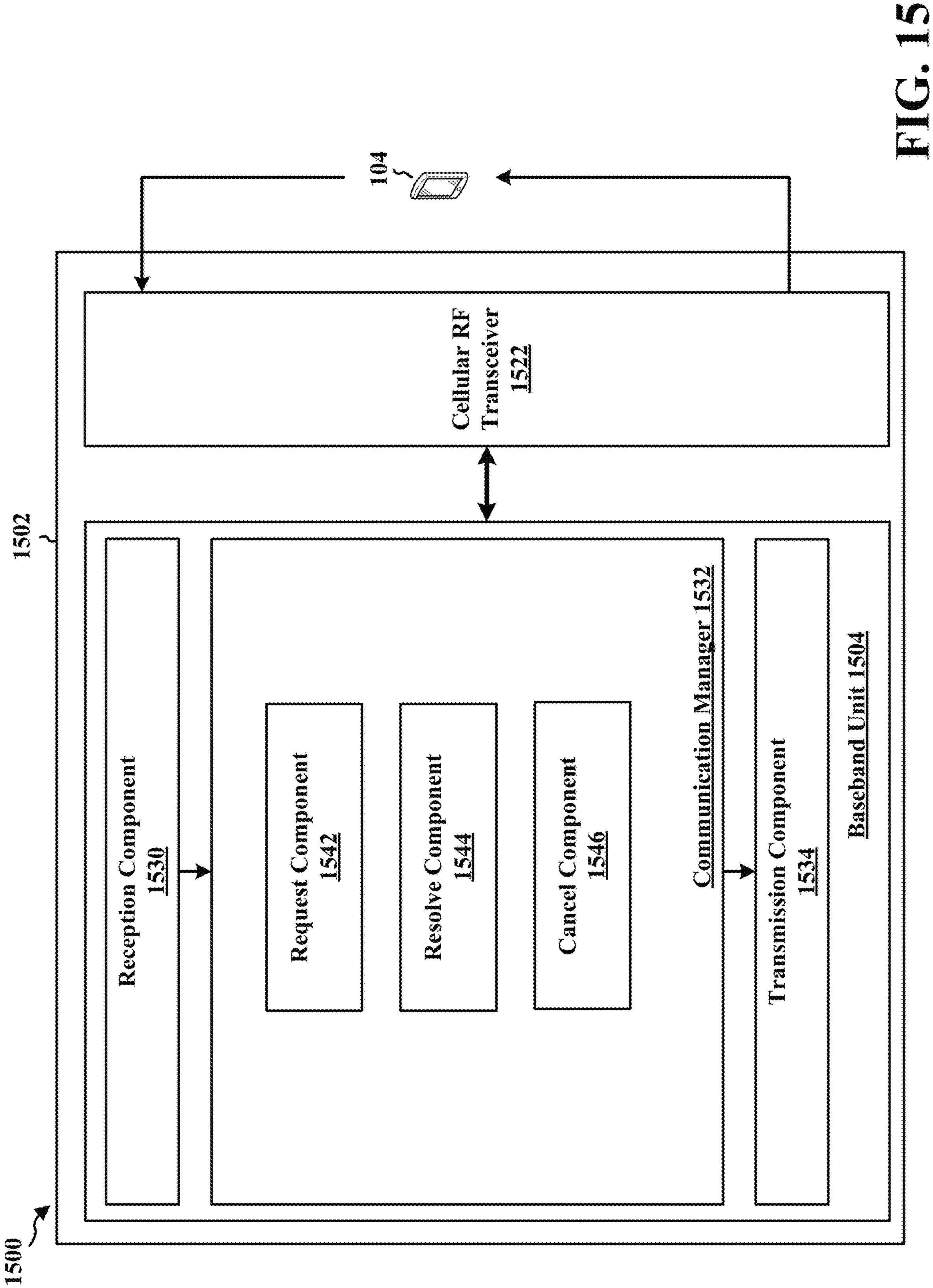
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1402 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 may include a request component 1542 that may transmit, to a UE, a location request requesting location information from the UE, receive, from the UE, an acknowledgment acknowledging the location request, transmit, to the UE based on the received acknowledgment, an MG request initiated by an LMF for the UE to measure its location based on the transmitted location request e.g., as described in connection with 902, 904, or 906 in FIG. 9 and 1002, 1004, or 1014 in FIG. 10. The request component 1542 may be further configured to send, to the LMF, information indicating that the transmitted location request was acknowledged by the UE, receive, from the LMF, a request to configure the MG at the UE, receive, from the UE in response to the transmitted location request, a request for positioning AD, transmit, to the UE based on the received request for the positioning AD, the positioning AD, transmit subsequent MG requests initiated by the LMF for the UE to measure its location, or receive subsequent MG request from the UE for the UE to measure its location, e.g., as described in connection with 1006, 1008, 1010, 1012, 1016, or 1018 in FIG. 10. The request component 1542 may be further configured to transmit, to a UE, a location request requesting location information from the UE, transmit, to the UE after transmitting the location request, an MG request initiated by an LMF for the UE to measure its location based on the transmitted location request, e.g., as described in connection with 1202 or 1204 in FIG. 12 and 1302 or 1304 in FIG. 13.

The communication manager 1532 further may include a resolve component 1544 that may receive, from the LMF, a first subsequent MG request for the UE to measure its location, receive, from the UE, a second subsequent MG request, or resolve the conflict e.g., as described in connection with 1020, 1022, or 1024 in FIG. 10 and 1310, 1312, or 1314 in FIG. 13. The communication manager 1532 further may include a cancel component 1546 that may receive, from the UE, a rejection rejecting the location request and receive, from the LMF based on the received rejection, an MG cancelation request to cancel the MG request for the UE, e.g., as described in connection with 1206 or 1208 in FIG. 12 and 1306 and 1308 in FIG. 13.

The apparatus may include additional components that perform each of the blocks of the algorithm in the flowcharts of FIGS. 9-10 and 12-13. As such, each block in the flowcharts of FIGS. 9-10 and 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, may include means for transmitting, to a UE, a location request requesting location information from the UE. The baseband unit 1504 may further include means for receiving, from the UE, an acknowledgment acknowledging the location request. The baseband unit 1504 may further include means for transmitting, to the UE based on the received acknowledgment, an MG request initiated by an LMF for the UE to measure its location based on the transmitted location request. The baseband unit 1504 may further include means for sending, to the LMF, information indicating that the transmitted location request was acknowledged by the UE. The baseband unit 1504 may further include means for receiving, from the LMF, a request to configure the MG at the UE. The baseband unit 1504 may further include means for receiving, from the UE in response to the transmitted location request, a request for positioning AD. The baseband unit 1504 may further include means for transmitting, to the UE based on the received request for the positioning AD, the positioning AD. The baseband unit 1504 may further include means for transmitting the MG request after transmitting the positioning AD to the UE. The baseband unit 1504 may further include means for transmitting subsequent MG requests initiated by the LMF for the UE to measure its location. The baseband unit 1504 may further include means for receiving subsequent MG requests from the UE for the UE to measure its location. The baseband unit 1504 may further include means for receiving, from the LMF, a first subsequent MG request for the UE to measure its location. The baseband unit 1504 may further include means for receiving, from the UE, a second subsequent MG request for the UE to measure its location, where there is concurrent reception of the first subsequent MG request and the second subsequent MG request, and where there is a conflict between the first subsequent MG request and the second subsequent MG request. The baseband unit 1504 may further include means for resolving the conflict between the first subsequent MG request and the second subsequent MG request by selecting to configure the UE with one of the first subsequent MG request or the second subsequent MG request. The baseband unit 1504 may further include means for resolving the conflict between the first subsequent MG request and the second subsequent MG request by selecting to configure the UE with the first subsequent MG request. The baseband unit 1504 may further include means for resolving the conflict between the first subsequent MG request and the second subsequent MG request by selecting to configure the UE with the second subsequent MG request. The baseband unit 1504 may further include means for informing the LMF about a resolution of the conflict of the concurrent reception of the first subsequent MG request and the second subsequent MG request. The baseband unit 1504 may further include means for transmitting, to a UE, a location request requesting location information from the UE. The baseband unit 1504 may further include means for transmitting, to the UE after transmitting the location request, an MG request initiated by an LMF for the UE to measure its location based on the transmitted location request. The baseband unit 1504 may further include means for receiving, from the UE, a rejection rejecting the location request. The baseband unit 1504 may further include means for receiving, from the LMF based on the received rejection, an MG cancelation request to cancel the MG request for the UE. The baseband unit 1504 may further include means for receiving, from the LMF, a first subsequent MG request for the UE to measure its location. The baseband unit 1504 may further include means for receiving, from the UE, a second subsequent MG request for the UE to measure its location, where there is concurrent reception of the first subsequent MG request and the second subsequent MG request, and where there is a conflict between the first subsequent MG request and the second subsequent MG request. The baseband unit 1504 may further include means for resolving the conflict between the first subsequent MG request and the second subsequent MG request by selecting to configure the UE with one of the first subsequent MG request or the second subsequent MG request. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

MGs may be occasions configured for a UE to perform measurements on various signals. In some examples, a UE may not perform certain measurements, such as inter-frequency measurements, inter-radio access technology, or intra-frequency measurements outside a BWP, while performing transmission and reception. Example aspects provided herein provide more efficient MG activation and deactivation procedures via signaling mechanisms that prevent configuring a UE with MG patterns that might be associated with a deactivated location request, and resolve conflicts between LMF-initiated and UE-initiated location requests.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station, comprising: a memory; a transceiver; and at least one processor, communicatively connected to the memory and the transceiver, the at least one processor configured to: transmit, to a UE, a location request requesting location information from the UE; receive, from the UE, an acknowledgment acknowledging the location request; and transmit, to the UE based on the received acknowledgment, a MG request initiated by a LMF for the UE to measure its location based on the transmitted location request.

Aspect 2 is the apparatus of aspect 1, wherein the at least one processor is further configured to: send, to the LMF, information indicating that the transmitted location request was acknowledged by the UE; and receive, from the LMF, a request to configure the MG at the UE, wherein the MG request is transmitted to the UE based on the received request from the LMF.

Aspect 3 is the apparatus of any of aspects 1-2, wherein the at least one processor is further configured to: receive, from the UE in response to the transmitted location request, a request for positioning AD; and transmit, to the UE based on the received request for the positioning AD, the positioning AD.

Aspect 4 is the apparatus of any of aspects 1-3, wherein the at least one processor is configured to transmit the MG request after transmitting the positioning AD to the UE.

Aspect 5 is the apparatus of any of aspects 1-4, wherein the at least one processor is further configured to transmit subsequent MG requests initiated by the LMF for the UE to measure its location.

Aspect 6 is the apparatus of any of aspects 1-5, wherein the at least one processor is further configured to receive subsequent MG requests from the UE for the UE to measure its location.

Aspect 7 is the apparatus of any of aspects 1-6, wherein the subsequent MG requests from the UE are received in acknowledgments to transmitted location requests.

Aspect 8 is the apparatus of any of aspects 1-7, wherein the at least one processor is further configured to: receive, from the LMF, a first subsequent MG request for the UE to measure its location; receive, from the UE, a second subsequent MG request for the UE to measure its location, wherein there is concurrent reception of the first subsequent MG request and the second subsequent MG request, and wherein there is a conflict between the first subsequent MG request and the second subsequent MG request; and resolve the conflict between the first subsequent MG request and the second subsequent MG request by selecting to configure the UE with one of the first subsequent MG request or the second subsequent MG request.

Aspect 9 is the apparatus of any of aspects 1-8, wherein the at least one processor is configured to resolve the conflict between the first subsequent MG request and the second subsequent MG request by selecting to configure the UE with the first subsequent MG request.

Aspect 10 is the apparatus of any of aspects 1-9, wherein the at least one processor is configured to resolve the conflict between the first subsequent MG request and the second subsequent MG request by selecting to configure the UE with the second subsequent MG request.

Aspect 11 is the apparatus of any of aspects 1-10, wherein the at least one processor is further configured to inform the LMF about a resolution of the conflict of the concurrent reception of the first subsequent MG request and the second subsequent MG request.

Aspect 12 is an apparatus for wireless communication at a UE, comprising: a memory; a transceiver; and at least one processor, communicatively connected to the memory and the transceiver, the at least one processor configured to: transmit, to a base station, UE capability information indicating whether the UE supports transmitting a MG request through one of more of RRC signaling, UCI, or an UL MAC-CE; receive, from the base station in response to the UE capability information, a MG request indication indicating one or more of the RRC signaling, the UCI, or the UL MAC-CE; and transmit, to the base station based on the MG request indication, the MG request.

Aspect 13 is the apparatus of aspect 12, wherein the MG request indication indicates the RRC signaling.

Aspect 14 is the apparatus of any of aspects 12-13, wherein the MG request indication indicates the UL MAC-CE.

Aspect 15 is the apparatus of any of aspects 12-14, wherein the MG request indication is implicit.

Aspect 16 is an apparatus for wireless communication at a base station, comprising: a memory; a transceiver; and at least one processor, communicatively connected to the memory and the transceiver, the at least one processor configured to: transmit, to a UE, a location request requesting location information from the UE; transmit, to the UE after transmitting the location request, a MG request initiated by a LMF for the UE to measure its location based on the transmitted location request; receive, from the UE, a rejection rejecting the location request; and receive, from the LMF based on the received rejection, an MG cancelation request to cancel the MG request for the UE.

Aspect 17 is the apparatus of aspect 16, wherein the at least one processor is further configured to send, to the LMF, information indicating that the transmitted location request was rejected by the UE, wherein the MG cancelation request is received from the LMF based on the information sent to the LMF.

Aspect 18 is the apparatus of any of aspects 16-17, wherein the at least one processor is further configured to transmit subsequent MG requests initiated by the LMF for the UE to measure its location.

Aspect 19 is the apparatus of any of aspects 16-18, wherein the at least one processor is further configured to receive subsequent MG requests from the UE for the UE to measure its location.

Aspect 20 is the apparatus of any of aspects 16-19, wherein the subsequent MG requests from the UE are received in acknowledgments to transmitted location requests.

Aspect 21 is the apparatus of any of aspects 16-20, wherein the at least one processor is further configured to: receive, from the LMF, a first subsequent MG request for the UE to measure its location; receive, from the UE, a second subsequent MG request for the UE to measure its location, wherein there is concurrent reception of the first subsequent MG request and the second subsequent MG request, and wherein there is a conflict between the first subsequent MG request and the second subsequent MG request; and resolve the conflict between the first subsequent MG request and the second subsequent MG request by selecting to configure the UE with one of the first subsequent MG request or the second subsequent MG request.

Aspect 22 is the apparatus of any of aspects 16-21, wherein the at least one processor is configured to resolve the conflict between the first subsequent MG request and the second subsequent MG request by selecting to configure the UE with the first subsequent MG request.

Aspect 23 is the apparatus of any of aspects 16-22, wherein the at least one processor is configured to resolve the conflict between the first subsequent MG request and the second subsequent MG request by selecting to configure the UE with the second subsequent MG request.

Aspect 24 is the apparatus of any of aspects 16-23, wherein the at least one processor is further configured to inform the LMF about a resolution of the conflict of the concurrent reception of the first subsequent MG request and the second subsequent MG request.

Aspect 25 is a method of wireless communication for implementing any of aspects 1 to 11.

Aspect 26 is an apparatus for wireless communication including means for implementing any of aspects 1 to 11.

Aspect 27 is a computer-readable medium storing computer executable code, where the code when executed by a processor causes the processor to implement any of aspects 1 to 11.

Aspect 28 is a method of wireless communication for implementing any of aspects 12 to 15.

Aspect 29 is an apparatus for wireless communication including means for implementing any of aspects 12 to 15.

Aspect 30 is a computer-readable medium storing computer executable code, where the code when executed by a processor causes the processor to implement any of aspects 12 to 15.

Aspect 31 is a method of wireless communication for implementing any of aspects 16 to 24.

Aspect 32 is an apparatus for wireless communication including means for implementing any of aspects 16 to 24.

Aspect 33 is a computer-readable medium storing computer executable code, where the code when executed by a processor causes the processor to implement any of aspects 16 to 24.

What is claimed is:

1. An apparatus for wireless communication at a base station, comprising:

a memory;

a transceiver; and at least one processor, communicatively connected to the memory and the transceiver, the at least one processor configured to:

transmit, to a user equipment (UE), a location request requesting location information from the UE;

receive, from the UE, an acknowledgment acknowledging the location request; and transmit, to the UE based on the received acknowledgment, a measurement gap (MG) request associated with a location management function (LMF) for the UE to measure its location based on the transmitted location request.

2. The apparatus of claim 1, wherein the at least one processor is further configured to:

send, to the LMF, information indicating that the transmitted location request was acknowledged by the UE; and receive, from the LMF, a request to configure the MG at the UE, wherein the MG request is transmitted to the UE based on the received request from the LMF.

3. The apparatus of claim 1, wherein the at least one processor is further configured to:

receive, from the UE in response to the transmitted location request, a request for positioning assistance data (AD); and transmit, to the UE based on the received request for the positioning AD, the positioning AD.

4. The apparatus of claim 3, wherein the at least one processor is configured to transmit the MG request after transmitting the positioning AD to the UE.

5. The apparatus of claim 1, wherein the at least one processor is further configured to transmit subsequent MG requests initiated by the LMF for the UE to measure its location.

6. The apparatus of claim 1, wherein the at least one processor is further configured to receive subsequent MG requests from the UE for the UE to measure its location.

7. The apparatus of claim 6, wherein the subsequent MG requests from the UE are received in acknowledgments to transmitted location requests.

8. The apparatus of claim 1, wherein the at least one processor is further configured to:

receive, from the LMF, a first subsequent MG request for the UE to measure its location;

receive, from the UE, a second subsequent MG request for the UE to measure its location, wherein there is concurrent reception of the first subsequent MG request and the second subsequent MG request, and wherein there is a conflict between the first subsequent MG request and the second subsequent MG request; and resolve the conflict between the first subsequent MG request and the second subsequent MG request by selecting to configure the UE with one of the first subsequent MG request or the second subsequent MG request.

9. The apparatus of claim 8, wherein the at least one processor is configured to resolve the conflict between the first subsequent MG request and the second subsequent MG request by selecting to configure the UE with the first subsequent MG request.

10. The apparatus of claim 8, wherein the at least one processor is configured to resolve the conflict between the first subsequent MG request and the second subsequent MG request by selecting to configure the UE with the second subsequent MG request.

11. The apparatus of claim 8, wherein the at least one processor is further configured to inform the LMF about a resolution of the conflict of the concurrent reception of the first subsequent MG request and the second subsequent MG request.

12. An apparatus for wireless communication at a user equipment (UE), comprising:

a memory;

a transceiver; and at least one processor, communicatively connected to the memory and the transceiver, the at least one processor configured to:

transmit, to a base station, UE capability information indicating whether the UE supports transmitting a measurement gap (MG) request through one of more of radio resource control (RRC) signaling, uplink control information (UCI), or an uplink (UL) medium access control (MAC) control element (CE) (MAC-CE);

receive, from the base station in response to the UE capability information, a MG request indication indicating one or more of the RRC signaling, the UCI, or the UL MAC-CE; and transmit, to the base station based on the MG request indication, the MG request.

13. The apparatus of claim 12, wherein the MG request indication indicates the RRC signaling.

14. The apparatus of claim 12, wherein the MG request indication indicates the UL MAC-CE.

15. The apparatus of claim 12, wherein the MG request indication is implicit.

16. An apparatus for wireless communication at a base station, comprising:

a memory;

a transceiver; and at least one processor, communicatively connected to the memory and the transceiver, the at least one processor configured to:

transmit, to a user equipment (UE), a location request requesting location information from the UE;

transmit, to the UE after transmitting the location request, a measurement gap (MG) request associated with a location management function (LMF) for the UE to measure its location based on the transmitted location request;

receive, from the UE, a rejection rejecting the location request; and receive, from the LMF based on the received rejection, an MG cancelation request to cancel the MG request for the UE.

17. The apparatus of claim 16, wherein the at least one processor is further configured to send, to the LMF, information indicating that the transmitted location request was rejected by the UE, wherein the MG cancelation request is received from the LMF based on the information sent to the LMF.

18. The apparatus of claim 16, wherein the at least one processor is further configured to transmit subsequent MG requests initiated by the LMF for the UE to measure its location.

19. The apparatus of claim 16, wherein the at least one processor is further configured to receive subsequent MG requests from the UE for the UE to measure its location.

20. The apparatus of claim 19, wherein the subsequent MG requests from the UE are received in acknowledgments to transmitted location requests.

21. The apparatus of claim 16, wherein the at least one processor is further configured to:

receive, from the LMF, a first subsequent MG request for the UE to measure its location;

receive, from the UE, a second subsequent MG request for the UE to measure its location, wherein there is concurrent reception of the first subsequent MG request and the second subsequent MG request, and wherein there is a conflict between the first subsequent MG request and the second subsequent MG request; and resolve the conflict between the first subsequent MG request and the second subsequent MG request by selecting to configure the UE with one of the first subsequent MG request or the second subsequent MG request.

22. The apparatus of claim 21, wherein the at least one processor is configured to resolve the conflict between the first subsequent MG request and the second subsequent MG request by selecting to configure the UE with the first subsequent MG request.

23. The apparatus of claim 21, wherein the at least one processor is configured to resolve the conflict between the first subsequent MG request and the second subsequent MG request by selecting to configure the UE with the second subsequent MG request.

24. The apparatus of claim 21, wherein the at least one processor is further configured to inform the LMF about a resolution of the conflict of the concurrent reception of the first subsequent MG request and the second subsequent MG request.

25. A method for wireless communication at a base station, comprising:

transmitting, to a user equipment (UE), a location request requesting location information from the UE;

receiving, from the UE, an acknowledgment acknowledging the location request; and transmitting, to the UE based on the received acknowledgment, a measurement gap (MG) request associated with a location management function (LMF) for the UE to measure its location based on the transmitted location request.

26. The method of claim 25, further comprising:

sending, to the LMF, information indicating that the transmitted location request was acknowledged by the UE; and receiving, from the LMF, a request to configure the MG at the UE, wherein the MG request is transmitted to the UE based on the received request from the LMF.

27. The method of claim 25, further comprising:

receiving, from the UE in response to the transmitted location request, a request for positioning assistance data (AD); and transmitting, to the UE based on the received request for the positioning AD, the positioning AD.

28. The method of claim 27, further comprising:

transmitting the MG request after transmitting the positioning AD to the UE.

29. The method of claim 27, further comprising:

transmitting subsequent MG requests initiated by the LMF for the UE to measure its location.

30. The method of claim 27, further comprising:

receiving subsequent MG requests from the UE for the UE to measure its location.

* * * * *